United States Patent
Uno

(10) Patent No.: US 9,533,662 B2
(45) Date of Patent: Jan. 3, 2017

(54) DRIVING ASSISTANCE SYSTEM, DRIVING ASSISTANCE METHOD AND ASSISTANCE INFORMATION PROVIDING APPARATUS

(71) Applicant: Satoshi Uno, Tokyo (JP)

(72) Inventor: Satoshi Uno, Tokyo (JP)

(73) Assignee: TOYOTA JODPSHA BAUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/438,444

(22) PCT Filed: Jan. 24, 2014

(86) PCT No.: PCT/IB2014/000063
§ 371 (c)(1),
(2) Date: Apr. 24, 2015

(87) PCT Pub. No.: WO2014/115019
PCT Pub. Date: Jul. 31, 2014

(65) Prior Publication Data
US 2015/0283984 A1    Oct. 8, 2015

(30) Foreign Application Priority Data
Jan. 28, 2013    (JP) .................................. 2013-013518

(51) Int. Cl.
*B60T 8/175*    (2006.01)
*B60T 8/176*    (2006.01)
*G08G 1/16*     (2006.01)

(52) U.S. Cl.
CPC ............... *B60T 8/175* (2013.01); *B60T 8/176* (2013.01); *G08G 1/164* (2013.01); *G08G 1/166* (2013.01)

(58) Field of Classification Search
CPC ........ B60T 8/175; B60T 8/1755; B60T 8/176; G08G 1/164; G08G 1/166
(Continued)

(56) References Cited

U.S. PATENT DOCUMENTS

2007/0027583 A1*    2/2007    Tamir ................. G06Q 30/0283
                                                                701/1
2007/0225882 A1*    9/2007    Yamaguchi ........... B60W 50/14
                                                                701/36
(Continued)

FOREIGN PATENT DOCUMENTS

JP    2008-065516 A    3/2008
JP    2009-029343 A    2/2009
(Continued)

OTHER PUBLICATIONS

Lars Hoehmann et al: "Car2X Communication for Vision-Based Object Detection", Software, Telecommunications and Computer Networks (SOFTCOM), 2010 International Conference on, IEEE, Piscataway, NJ, USA, Sep. 23, 2010, pp. 290-294, XP031791567, ISBN: 978-1-4244-8663-2.

*Primary Examiner* — John Q Nguyen
*Assistant Examiner* — Anshul Sood
(74) *Attorney, Agent, or Firm* — Sugrue Mion, PLLC

(57) ABSTRACT

A driving assistance system includes: a storage apparatus (14) configured to store an operation result of a first assistance apparatus (50) performing first driving assistance on a first movable body (20A); a determination unit (135) configured to determine whether or not an operation result of a second assistance apparatus (40) performing second driving assistance on a second movable body (30) is related to the operation result of the first assistance apparatus (50) stored in the storage apparatus (14); an information providing unit (134, 133) configured to provide assistance information based on an operation result of the first assistance apparatus (50) when the determination unit (135) determines that the operation result of the second assistance apparatus (40) is related to the operation result of the first assistance apparatus (50); and an assistance unit (323) configured to perform
(Continued)

driving assistance on the second movable body (30) based on the assistance information.

8 Claims, 11 Drawing Sheets

(58) Field of Classification Search
USPC .......................................................... 701/71
See application file for complete search history.

(56) References Cited

U.S. PATENT DOCUMENTS

| | | | |
|---|---|---|---|
| 2009/0192676 A1* | 7/2009 | Sidlosky | B60T 8/1755 701/41 |
| 2011/0106381 A1* | 5/2011 | Filev | B62D 6/007 701/40 |
| 2011/0251748 A1* | 10/2011 | Moran | B60T 8/1755 701/31.4 |
| 2011/0270501 A1 | 11/2011 | Ito et al. | |

FOREIGN PATENT DOCUMENTS

| | | |
|---|---|---|
| JP | 2011-203017 A | 10/2011 |
| WO | 2011/135725 A1 | 11/2011 |

* cited by examiner

DRIVING ASSISTANCE SYSTEM, DRIVING ASSISTANCE METHOD AND ASSISTANCE INFORMATION PROVIDING APPARATUS

BACKGROUND OF THE INVENTION

1. Field of the Invention

This invention relates to a driving assistance system that assists driving of a movable body, a driving assistance method used by the driving assistance system, and an assistance information providing apparatus.

2. Description of Related Art

As is commonly available, vehicles such as automobiles are provided with various assistance apparatuses. These assistance apparatuses detect vehicle information including information based on driving operations by a driver and vehicle speed and traveling environment that is information based on a preceding vehicle and road conditions, and provide vehicles with driving assistance including preventive safety assistance based on the detected vehicle information and traveling environment. Examples of such assistance apparatuses include an anti-lock braking system (ABS) that prevents tires from being locked, a vehicle stability control (VSC) system that prevents a vehicle from skidding, and a collision prevention apparatus. For example, Japanese Patent Application Publication No. 2009-29343 (JP 2009-29343 A) describes an example of a driving assistance system including a plurality of such assistance apparatuses.

The driving assistance system described in JP 2009-29343 A includes a driving assistance apparatus (a preventive safety apparatus such as an ABS or a VSC) and a storage unit that stores a traveling location, a traveling environment, and a vehicle condition at the time of operation of the driving assistance apparatus. The driving assistance system stores the traveling location and the traveling environment together with the vehicle condition when the driving assistance apparatus is operated or when a sensor value acquired from a wheel speed sensor, a yaw rate sensor, or a brake pressure sensor that causes the driving assistance apparatus to operate exceeds a set threshold. Moreover, in this system, traveling locations include a slope, an unpaved road, a curve, a parking lot, and an intersection, traveling environment includes an absolute time, snowfall information, rainfall information, and external temperature, and vehicle conditions include a vehicle speed. As the vehicle is to travel a traveling location stored in the storage unit in a traveling environment and under a vehicle condition which are similar to the stored traveling environment and the stored vehicle condition, the driving assistance system performs driving assistance such as issuing a warning notification to the driver and controlling vehicle deceleration.

SUMMARY OF THE INVENTION

In recent years, systems in which information (operation point information) regarding points at which driving assistance apparatuses had operated is collected at centers that manage information regarding driving assistance to use the collected information by a large number of vehicles are being considered. According to such systems, by providing vehicles with operation point information of driving assistance apparatuses collected at the center, in a vehicle provided with the information, the driver of the vehicle can be notified of points, at which a driving assistance apparatus is likely to operate, before arriving at such points. However, notifying a vehicle driver of all operation point information provided by the center may be bothersome to the driver on the grounds that, for example, individual differences among drivers are not negligible as operating factors of driving assistance apparatuses.

Such problems are not limited to the collection and management of information at a center and are more or less common among systems in which information is shared by a plurality of vehicles through inter-vehicle communication and the like.

The invention provides a driving assistance system capable of providing driving assistance more effectively, a driving assistance method used by the driving assistance system, and an assistance information providing apparatus.

A first aspect of the invention is a driving assistance system including: a storage apparatus configured to store an operation result of a first assistance apparatus configured to perform first driving assistance on a first movable body; a determination unit configured to determine whether or not an operation result of a second assistance apparatus configured to perform second driving assistance that differs from the first driving assistance on a second movable body is related to the operation result of the first assistance apparatus stored in the storage apparatus; an information providing unit configured to provide assistance information based on an operation result of the first assistance apparatus when the determination unit determines that the operation result of the second assistance apparatus is related to the operation result of the first assistance apparatus; and an assistance unit configured to acquire assistance information provided by the information providing unit and to perform driving assistance on the second movable body based on the assistance information.

A second aspect of the invention relates to a driving assistance method used by a driving assistance system including a storage apparatus configured to store an operation result of a first assistance apparatus configured to perform first driving assistance on a first movable body. The method includes: determining whether or not an operation result of a second assistance apparatus configured to perform second driving assistance that differs from the first driving assistance on a second movable body is related to the operation result of the first assistance apparatus stored in the storage apparatus; providing assistance information based on an operation result of the first assistance apparatus when determination is made that the operation result of the second assistance apparatus is related to the operation result of the first assistance apparatus; and performing driving assistance on the second movable body based on the provided assistance information.

A third aspect of the invention is an assistance information providing apparatus including: an information management unit configured to acquire an operation result of a first assistance apparatus and an operation result of a second assistance apparatus that differs from the first assistance apparatus; a determination unit configured to determine whether or not the acquired operation result of the second assistance apparatus is related to the acquired operation result of the first assistance apparatus; and an information providing unit configured to provide a movable body, on which driving assistance by the second assistance apparatus is performed, with assistance information based on an operation result of the first assistance apparatus when the determination unit determines that the operation result of the second assistance apparatus is related to the operation result of the first assistance apparatus.

According to such configurations, when there the operation result of the first assistance apparatus is related to the operation result of the second assistance apparatus, driving assistance based on the operation result of the first assistance apparatus is performed on the second movable body regardless of whether or not the operation of the first assistance apparatus is performed on the second movable body. Accordingly, even in the case of a movable body for which the first assistance apparatus is inoperative or which is not mounted with the first assistance apparatus, as long as the movable body receives driving assistance by the second assistance apparatus, the movable body is also able to receive driving assistance based on an operation result of the first assistance apparatus. In addition, since such driving assistance is only performed when the operation result of the first assistance apparatus is related to the operation result of the second assistance apparatus, a driver or the like is less likely to feel inconvenienced. Accordingly, greater driving assistance can be provided more effectively.

In the driving assistance system, the first movable body and the second movable body may be movable bodies that differ from each other. According to such a configuration, even if the second movable body is a movable body which does not receive driving assistance from the first assistance apparatus, driving assistance based on the operation result of the first assistance apparatus is performed based on the relevance between the operation result of the second assistance apparatus and the operation result of the first assistance apparatus. Accordingly, greater driving assistance can be provided to a movable body that receives driving assistance from the second assistance apparatus such as a movable body that includes the second assistance apparatus.

In the driving assistance system, the first movable body and the second movable body may be vehicles. In this case, one of the first assistance apparatus and the second assistance apparatus may be an apparatus configured to prevent a vehicle from skidding to stabilize the vehicle, and the other assistance apparatus may be an apparatus that prevents wheels from locking during braking.

According to such a configuration, even a vehicle mounted with only one of a so-called ABS that is an apparatus for preventing a wheel from locking during braking and a VSC system that is an apparatus for preventing, a vehicle from skidding and stabilizing the vehicle or a vehicle in which one of an ABS or a VSC system is inoperative, as long as the vehicle is mounted with the other apparatus, the vehicle is capable of receiving driving assistance using the apparatus that is not mounted (or inoperative). Accordingly, greater driving assistance can be provided more effectively.

In the driving assistance system, the determination unit may be configured to determine whether or not the operation result of the second assistance apparatus is related to the operation result of the first assistance apparatus based on the number of operations of the second assistance apparatus.

In the driving assistance system, the determination unit may be configured to determine for each user whether or not the operation result of the second assistance apparatus is related to the operation result of the first assistance apparatus based on the operation result of the second assistance apparatus for each user.

According to such a configuration, since whether or not the operation result of the second assistance apparatus is related to the operation result of the first assistance apparatus is determined for each user, driving assistance that is suitable for the user can be provided. Accordingly, driving assistance can be provided more effectively.

In the driving assistance system, the storage apparatus and the determination unit may be provided outside of the first movable body and the second movable body, and the storage apparatus may be configured to store operation results of a plurality of the first assistance apparatuses. In this case, the determination unit may be configured to determine whether or not the operation result of the second assistance apparatus is, related to the operation result of the first assistance apparatus based on the respective, operation results of the first assistance apparatuses stored in the storage apparatus.

According to such a configuration, the storage apparatus and the determination unit can be provided outside the movable body. As a result, the storage apparatus can more readily collect operation results from a plurality of the first assistance apparatuses and determine whether or not the operation result of the second assistance apparatus is related to the operation result of the first assistance apparatus based on the operation results of a larger number of the first assistance apparatuses. Accordingly, greater driving assistance can be provided more effectively.

In the driving assistance system, the information providing unit may be provided outside of the first movable body and the second movable body. In this case, the information providing unit may be configured to provide the assistance unit with only assistance information for which the determination unit has determined that the operation result of the second assistance apparatus is related to the operation result of the first assistance apparatus.

According to such a configuration, only the operation result of the first assistance apparatus is related to the operation result of the second assistance apparatus is provided as assistance information. As a result, a processing load of transmission of assistance information and a processing load on the movable body to which the information is transmitted are reduced.

In the driving assistance system, the information providing unit may be provided on the second movable body, and the information providing unit may be configured to provide the assistance unit with the assistance information obtained based on a determination result of the determination unit.

According to such a configuration, driving assistance is preferably provided to the second movable body using assistance information based on the operation result of the first assistance apparatus is related to the operation result of the second assistance apparatus.

In the driving assistance system, the assistance information may include an operation position at which the first assistance apparatus had been operated, and the information providing unit may be configured to provide the assistance information when the second movable body reaches the operation position.

According to such a configuration, driving assistance based on the operation result of the first assistance apparatus is provided to the second movable body at an operating position at which driving assistance is performed by the first assistance apparatus. As a result, driving assistance is suitably performed to a position that requires driving assistance.

In the driving assistance system, the second movable body may be a movable body on which the first driving assistance by the first assistance apparatus is not performed.

The driving assistance system may further includes a driving characteristics determination unit configured to determine whether or not first driving characteristics information associated with an operation result of the first assistance apparatus is similar to second driving characteristics information associated with an operation result of the second assistance apparatus. In this case, the first driving characteristics information and the second driving characteristics information may be information that respectively indicate characteristics of driving operations performed by drivers, and the information providing unit may be configured to provide the assistance unit with the assistance information when the determination unit determines that the operation result of the second assistance apparatus is related to the operation result of the first assistance apparatus and when the driving characteristics determination unit determines that the first driving characteristics information is similar to the second driving characteristics information.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A first embodiment of a driving assistance system will be described with reference to FIGS. 1 to 6. First, a general configuration of the driving assistance system will be described with reference to FIG. 1.

Figure 1:
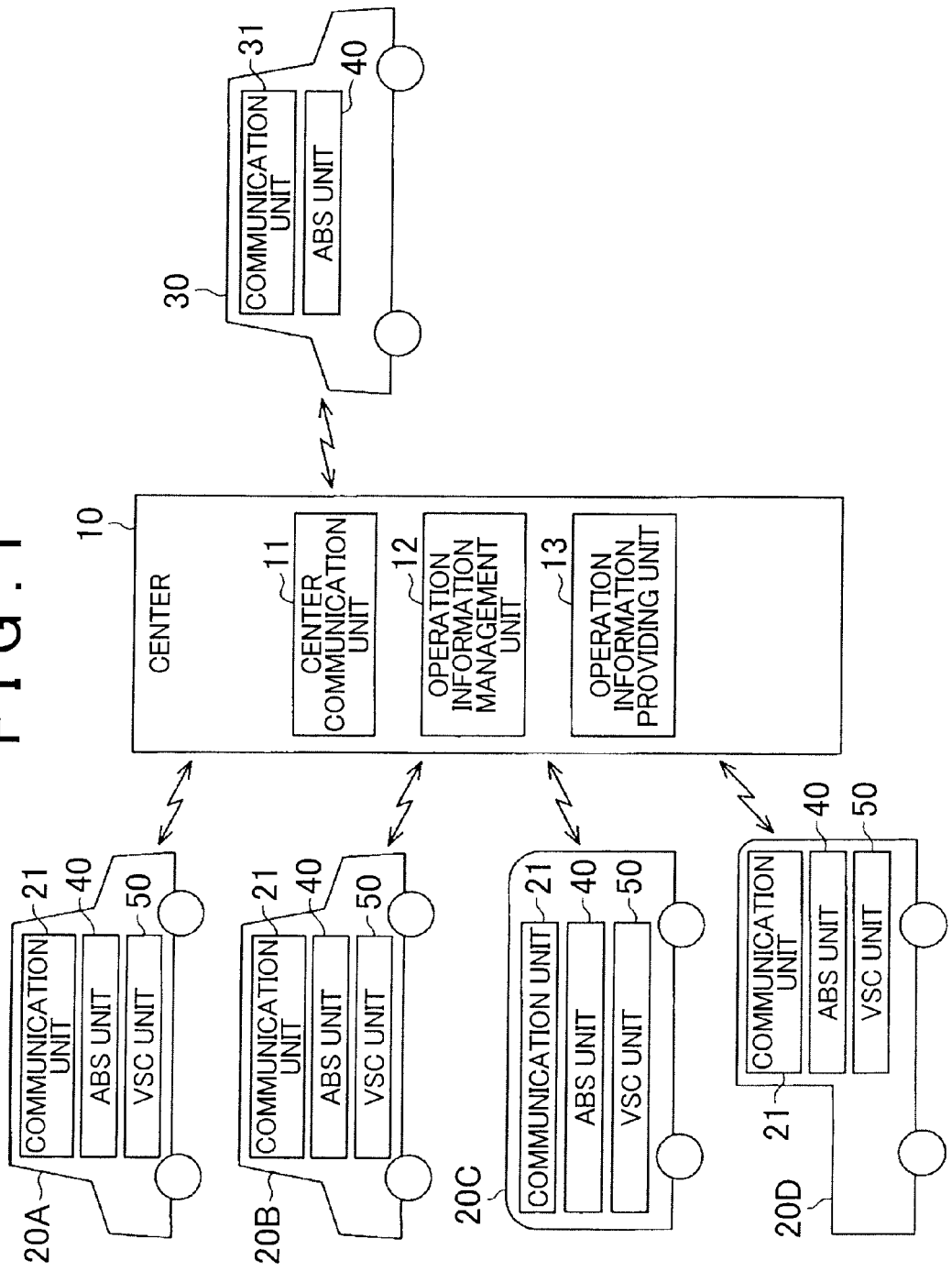
FIG. 1 is a block diagram showing a general configuration of a first embodiment of a driving assistance system.

As shown in FIG. 1, the driving assistance system includes a center 10 configured to manage information regarding driving assistance, provider vehicles 20A, 20B, 20C, and 20D as a plurality of first movable bodies configured to provide information regarding driving assistance to the center 10, and a user vehicle 30 as a second movable body configured to acquire information regarding driving assistance and the like from the center 10 and use the acquired information for driving assistance.

The provider vehicles 20A to 20D are various types of vehicles that travel on roads such as passenger cars, buses, and trucks. Each of the provider vehicles 20A to 20D includes a vehicle mounted communication unit 21 configured to exchange various types of information including information regarding driving assistance with the center 10 and other external apparatuses via wired communication or wireless communication. In addition, each of the provider vehicles 20A to 20D includes an ABS unit 40 as an assistance apparatus, which is configured to control driving of an ABS for preventing a wheel from locking during braking and a VSC unit 50 as a first assistance apparatus, which is configured to control driving of a VSC system for preventing a vehicle from skidding. The provider vehicles 20A to 20D are capable of respectively transmitting an ABS operation result that is created based on an operation of the ABS and a VSC operation result that is created based on an operation of the VSC to the center 10.

The user vehicle 30 is a vehicle that travels on roads such as a passenger car. The user vehicle 30 includes a vehicle mounted communication unit 31 configured to exchange various types of information including information regarding driving assistance with the center 10 and other external apparatuses via wired communication or wireless communication. In addition, the user vehicle 30 includes an ABS unit 40 as a second assistance apparatus, which is configured to control driving of an ABS for preventing a wheel from locking during braking. The user vehicle 30 is capable of transmitting an ABS operation result that is created based on an operation of the ABS to the center 10.

The center 10 includes a center communication unit 11 configured to exchange various types of information including information regarding driving assistance with the provider vehicles 20A to 20D, the user vehicle 30, and other external apparatuses via wired communication or wireless communication. In addition, the center 10 includes an operation information management unit 12 configured to acquire ABS operation results and VSC operation results from the provider vehicles 20A to 20D and the user vehicle 30 and to manage the operation results. Furthermore, the center 10 includes an operation information providing unit 13 configured to provide vehicles with ABS operation information and VSC operation information that are managed by the center 10.

Therefore, the center 10 is capable of acquiring ABS operation results and VSC operation results from the provider vehicles 20A to 20D via information communication between the center communication unit 11 and the vehicle mounted communication units 21 and transmitting ABS operation results and VSC operation results that are managed by the center 10 to the provider vehicles 20A to 20D. In addition, the center 10 is capable of acquiring ABS operation results from the user vehicle 30 via information communication between the center communication unit 11 and the vehicle mounted communication unit 31 and transmitting ABS operation results that are managed by the center 10 to the user vehicle 30. In the embodiment, the center 10 is capable of transmitting VSC operation results managed by the center 10 even to the user vehicle 30 which is not mounted with a VSC and which therefore does not output a VSC operation result. In other words, even the user vehicle 30 that is not mounted with a VSC can provide a driver with driving assistance based on a VSC operation result provided from the center 10.

Next, a configuration of the driving assistance system according to the embodiment will be described in detail. Moreover, components for driving assistance such as the vehicle mounted communication unit 21, the ABS unit 40, and the VSC unit 50 which are respectively provided in the provider vehicles 20A, 20B, 20C, and 20D are constituted similarly to each other. Therefore, only one provider vehicle 20A will be described below. Descriptions of the other provider vehicles 20B, 20C, and 20D will be omitted for the sake of simplicity unless otherwise required.

Figure 2:
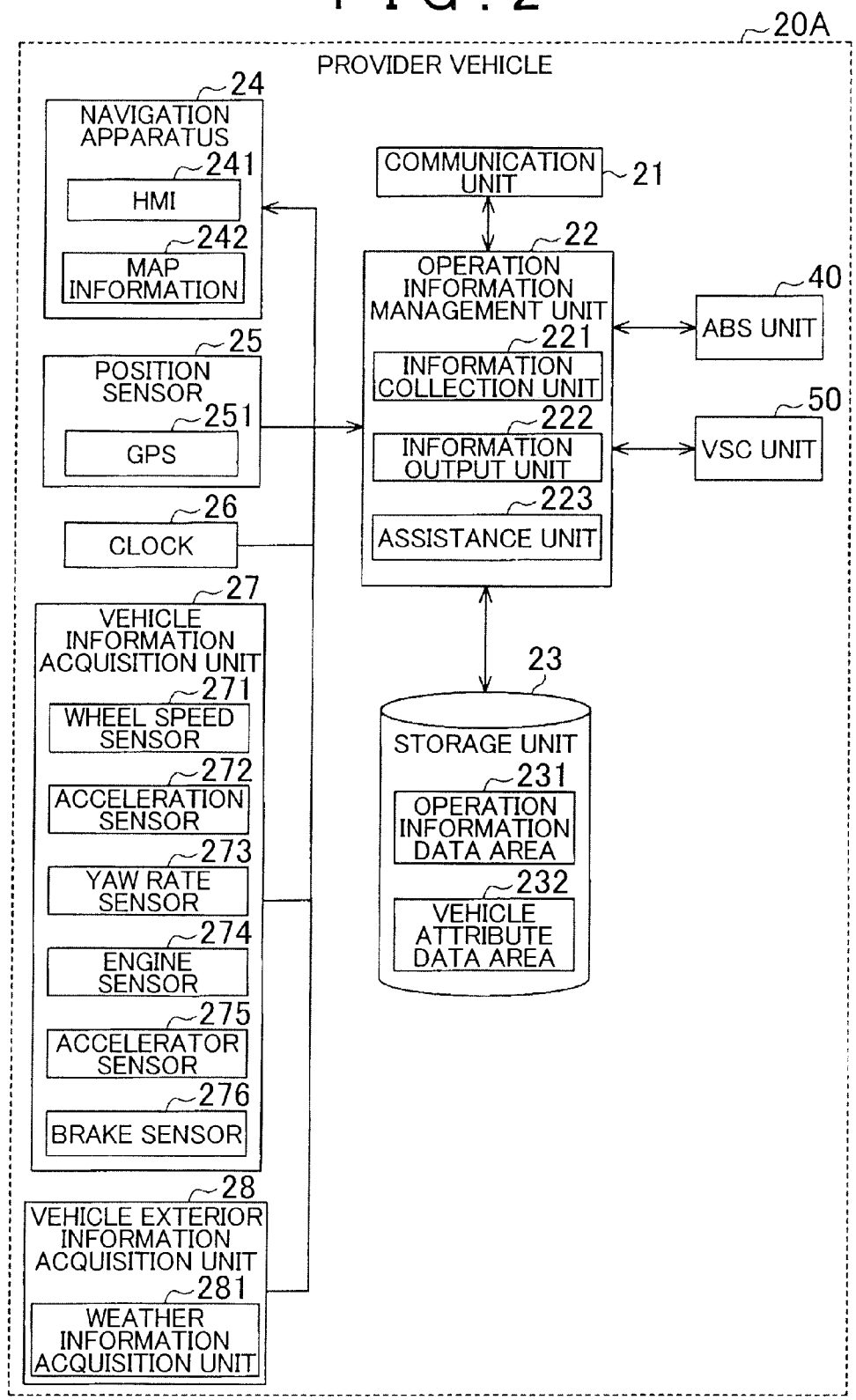
FIG. 2 is a block diagram showing a general configuration of a vehicle that provides an operation result of a driving assistance apparatus according to the embodiment.

As shown in FIG. 2, the provider vehicle 20A includes a navigation apparatus 24 configured to provide the driver with information regarding route guidance, a position sensor 25 configured to detect a current position, a clock 26 configured to indicate a current time, a vehicle information acquisition unit 27 configured to acquire information regarding the vehicle, and a vehicle exterior information acquisition unit 28 configured to acquire vehicle exterior information of the vehicle. The navigation apparatus 24, the position sensor 25, the clock 26, the vehicle information acquisition unit 27, and the vehicle exterior information acquisition unit 28 are respectively connected to the operation information management unit 22 so that various types of retained information can be respectively transmitted.

The navigation apparatus 24 guides the driver with a travel route to a travel destination by referring to a current position of the vehicle that is detected using a global positioning system (GPS) or the like and map information 242 including road information that is stored in advance. The navigation apparatus 24 includes a human-machine interface (HMI) 241 that is constituted by a display apparatus, an input apparatus, and an audio apparatus. In addition, the navigation apparatus 24 is capable of causing the HMI 241 to output information regarding driving assistance that is inputted from the operation information management unit 22 and notify the driver of the information.

The display apparatus is constituted by a liquid crystal display or the like and is installed at a position that is visible from the driver. Information regarding guidance of a travel route is displayed on the display apparatus in the form of images or the like. For example, the navigation apparatus 24 generates image data that combines the current position of the provider vehicle 20A and a map of a surrounding area thereof and causes the display apparatus to display the generated image data. A touch switch that is integrated with the display apparatus, a mechanical switch, or the like is used as the input apparatus. The input apparatus is used to perform various input operations. The audio apparatus is an apparatus that generates sound and voices. The audio apparatus outputs a sound or a voice corresponding to sound data, voice data, or the like inputted from the navigation apparatus 24. The navigation apparatus 24 outputs route guidance and audio information such as traffic information via the audio apparatus.

The position sensor 25 includes a GPS 251 that is used to detect the current position of the provider vehicle 20A. The GPS 251 receives a signal from a GPS satellite and detects a current position of the provider vehicle 20A based on the signal received from the GPS satellite. The position sensor 25 outputs information indicating the detected position to the operation information management unit 22 and the like. The position sensor 25 may be shared with the navigation apparatus 24.

The clock 26 outputs information indicating a current time to the operation information management unit 22 and the like. The current time can also be obtained from the GPS 251. The vehicle information acquisition unit 27 includes a wheel speed sensor 271, an acceleration sensor 272, a yaw rate sensor 273, an engine sensor 274, an accelerator sensor 275, and a brake sensor 276.

The wheel speed sensor 271 detects a rotation speed of a wheel of the provider vehicle 20A and outputs a signal in accordance with the detected rotation speed to the operation information management unit 22 and the like. For example, it is assumed that the vehicle is stopped when a signal indicating a rotational speed of "0" is outputted from the wheel speed sensor 271.

The acceleration sensor 272 detects acceleration of the provider vehicle 20A and outputs a signal in accordance with the detected acceleration to the operation information management unit 22 and the like. For example, it is assumed that the vehicle is stopped or traveling in an extremely stable manner when a signal indicating an acceleration of approximately "0" is outputted from the acceleration sensor 272.

The yaw rate sensor 273 detects a speed (yaw rate) at which a rotation angle of the provider vehicle 20A varies in a turning direction and outputs a signal in accordance with the detected yaw rate to the operation information management unit 22 and the like. For example, it is assumed that the vehicle is turning or skidding when a signal indicating a variation in the rotation angle is being outputted from the yaw rate sensor 273.

The engine sensor 274 detects a rotation speed of an engine of the provider vehicle 20A and outputs a signal in accordance with the detected rotation speed to the operation information management unit 22 and the like. For example, it is assumed that the vehicle is stopped when a signal indicating a rotational speed of "0" is outputted from the engine sensor 274.

The accelerator sensor 275 detects whether or not an accelerator pedal has been operated by the driver or detects a depression amount of the accelerator pedal and outputs a signal in accordance with a detection result of whether or not the accelerator pedal has been operated by the driver or a detected depression amount of the accelerator pedal to the operation information management unit 22 and the like. For example, it is assumed that a driving (acceleration) operation of the vehicle is being performed when a signal indicating that the accelerator pedal is being depressed is outputted from the accelerator sensor 275.

The brake sensor 276 detects whether or not an brake pedal has been operated by the driver or detects a depression amount of the brake pedal and outputs a signal in accordance with a detection result of whether or not the brake pedal has been operated by the driver or a detected depression amount of the brake pedal to the operation information management unit 22 and the like. The brake sensor 276 may include a sensor for detecting an operation of a foot brake that is a normally used brake as well as a sensor for detecting whether, or not a parking brake has been operated. For example, it is assumed that a braking (deceleration) operation of the vehicle is being performed when a signal indicating that the brake pedal is being depressed is outputted from the brake sensor 276.

The vehicle exterior information acquisition unit 28 includes a weather information acquisition unit 281 configured to acquire information regarding weather that is one of the aspects of the external environment of the provider vehicle 20A. The weather information acquisition unit 281 is connected to the operation information management unit 22 and the like so as to be capable of transmitting various types of retained information. The weather information acquisition unit 281 is an apparatus that acquires current weather information by detecting a wiper operation, acquiring a value of a thermometer, a hygrometer, or a barometer, or acquiring such values from a radio or from a weather report system by communication, and outputs a signal in accordance with the acquired weather information to the operation information management unit 22 and the like.

In addition, the vehicle exterior information acquisition unit 28 may include a communication apparatus configured to acquire road information, traffic information, and the like via road-vehicle, communication from a land-based facility provided on the road or the like and a communication apparatus configured to acquire various types of information from other vehicles via inter-vehicle communication.

The ABS unit 40 constitutes an ABS that is a system for preventing a wheel from locking during braking and controls driving of the ABS. The ABS unit 40 has a conventional construction for providing the vehicle with driving assistance by the ABS based on information from the various sensors of the vehicle information acquisition unit 27 and the like. Although not illustrated, the ABS unit 40 is capable of acquiring various types of sensor information from the vehicle information acquisition unit 27 in real time. In addition, in the embodiment, the ABS unit 40 is connected to the operation information management unit 22 so as to be capable of transmitting information and outputs operation information of an ABS function to the operation information management unit 22. Operation information of the ABS function includes whether or not the ABS is in operation and a braking force on each wheel during an ABS operation.

The VSC unit 50 constitutes a VSC for preventing the vehicle from skidding and controls driving of the VSC. The VSC unit 50 has a conventional construction for providing the vehicle with driving assistance by the VSC based on information from the various sensors of the vehicle information acquisition unit 27 and the like. Although not illustrated, the VSC unit 50 is capable of acquiring various types of sensor information from the vehicle information acquisition unit 27 in real time. In addition, in the embodiment, the VSC unit 50 is connected to the operation information management unit 22 so as to be capable of transmitting information and outputs operation information of a VSC function to the operation information management unit 22. Operation information of the VSC function includes whether or not the VSC is in operation, and engine output and a braking force on each wheel during a VSC operation.

As shown in FIG. 2, the provider vehicle 20A includes the operation information management unit 22 configured to manage ABS operation information and VSC operation information together with vehicle information and vehicle exterior information, and a storage unit 23 configured to retain the various types of information managed by the operation information management unit 22. The operation information management unit 22 is connected to the ABS unit 40, the VSC unit 50, and the vehicle mounted communication unit 21 so that information can be mutually transmitted. In addition, the operation information management unit 22 is connected to the storage unit 23 so as to be capable of reading and writing various types of information.

The operation information management unit 22 includes an information collection unit 221 configured to generate an ABS operation result and a VSC operation result and to cause the storage unit 23 to retain the generated ABS operation result and VSC operation result, and an information output unit 222 configured to output the ABS operation result and the VSC operation result retained in the storage unit 23 to the center 10 via the vehicle mounted communication unit 21. In addition, the operation information management unit 22 includes an assistance unit 223 configured to receive the ABS operation result and the VSC operation result as assistance information and perform driving assistance based on the received assistance information.

The storage unit 23 is constituted by all of or a part of a storage area provided in a conventional storage apparatus. The storage area includes an operation information data area 231 and a vehicle attribute data area 232. The operation information data area 231 stores the ABS operation result and the VSC operation result that are written by the information collection unit 221, and the ABS operation result and the VSC operation result that are stored in the operation information data area 231 are read out by the information output unit 222. The operation information data area 231 need only enable adding, reading, deleting, and the like of the ABS operation result, the VSC operation result, and the like, and may be constituted by a so-called data base. The vehicle attribute data area 232 includes information for specifying a host vehicle, information indicating a vehicle type or vehicle specifications, information indicating a type of a mounted assistance apparatus (for example, an ABS or a VSC), and the like. In other words, the vehicle attribute data area 232 stores information indicating that an ABS and a VSC are mounted.

The information collection unit 221 generates information that associates various types of vehicle information and various types of vehicle exterior information with ABS operation information as an ABS operation result. The ABS operation information is information which is obtained from the ABS unit 40 and which indicates that the ABS has been operated. In addition, the information collection unit 221 writes the generated ABS operation result into the operation information data area 231 or, in other words, causes the operation information data area 231 to additionally store the generated ABS operation result. In addition, the information collection unit 221 generates information that associates various types of vehicle information and various types of vehicle exterior information with VSC operation information as a VSC operation result. The VSC operation information is information which is obtained from the VSC unit 50 and which indicates that the VSC has been operated. In addition, the information collection unit 221 writes the generated VSC operation result into the operation information data area 231 or, in other words, causes the operation information data area 231 to additionally store the generated VSC operation result.

Figure 5:
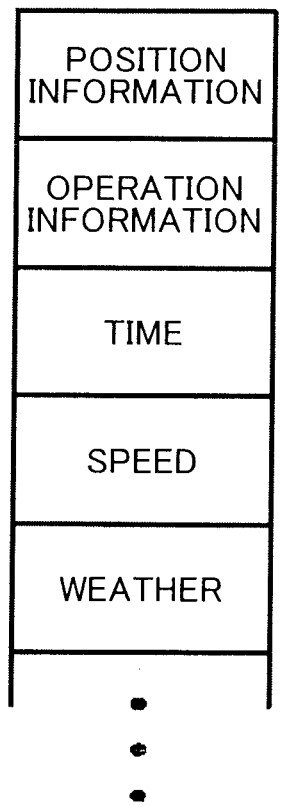
FIG. 5 is a schematic diagram that schematically illustrates information included in assistance information according to the embodiment.

As shown in FIG. 5, an ABS operation result and a VSC operation result include position information, operation information, and information such as time, speed, and weather. In addition, an ABS operation result and a VSC operation result may include necessary information among information acquired from the vehicle attribute data area 232 of the storage unit 23, map information and road information acquired from the navigation apparatus 24, a position acquired from the position sensor 25, time acquired from the clock 26, and the like. Furthermore, an ABS operation result and a VSC operation result may include, as vehicle information, necessary information among information such as an operation amount of a brake pedal that is acquired from the vehicle information acquisition unit 27 and, as vehicle exterior information, necessary information among information such as weather information and traffic information acquired from the vehicle exterior information acquisition unit 28.

The ABS operation result and the VSC operation result generated in this manner are information collected based on an actual travel of the provider vehicle 20A. Each of the collected operation results include information that cannot be recorded in advance in the navigation apparatus or the like. In other words, such operation results are desirably acquired from a large number of vehicles that are actually traveling.

The information output unit 222 reads the ABS operation result and the VSC operation result stored in the operation information data area 231 of the storage unit 23 and outputs each of the read operation results to the center 10. The information output unit 222 has a prescribed condition such as elapsing of a prescribed period of time or stopping of the provider vehicle 20A as a read condition of each operation result. In addition, based on the read condition, the information output unit 222 selects and reads each operation result that is not yet outputted to the center 10, and outputs, to the center 10 via the vehicle mounted communication unit 21, each of the read operation results that is not yet outputted. Moreover, the information output unit 222 may delete ABS operation results and VSC operation results already outputted to the center 10 from the operation information data area 231 of the storage unit 23.

In addition, the assistance unit 223 acquires an ABS operation result and a VSC operation result from the center 10 as assistance information and performs driving assistance such as issuing a notification to the driver based on the acquired assistance information. To this end, the assistance unit 223 outputs an assistance information request signal including information for specifying the host vehicle, current position information, vehicle attributes, and the like to the center 10, and receives assistance information such as an ABS operation result and a VSC operation result that are returned from the center 10 to the host vehicle. In addition, when the host vehicle approaches the operation position included in the received assistance information (respective operation results), the assistance unit 223 can notify the driver via the HMI 241 of the navigation apparatus 24 that the assistance apparatus (an ABS or a VSC) of another vehicle had been operated at the operation position. Moreover, the assistance unit 223 may determine whether or not the vehicle information, the vehicle exterior information, and the like included in the ABS operation result or the VSC operation result is similar to the current vehicle information or the current vehicle exterior information of the host vehicle, and may perform driving assistance based on the operation result when the information is similar. Furthermore, when the operation information data area 231 retains an ABS operation result and a VSC operation result that are similar to the ABS operation result and the VSC operation result acquired from the center 10, the assistance unit 223 may perform driving assistance based on the operation result. Accordingly, since ABS operation results and VSC operation results acquired from the center 10 can be appropriately filtered, driving assistance which is unsuitable for the host vehicle and which may cause the driver to feel inconvenienced is prevented and driving assistance is performed effectively.

Figure 3:
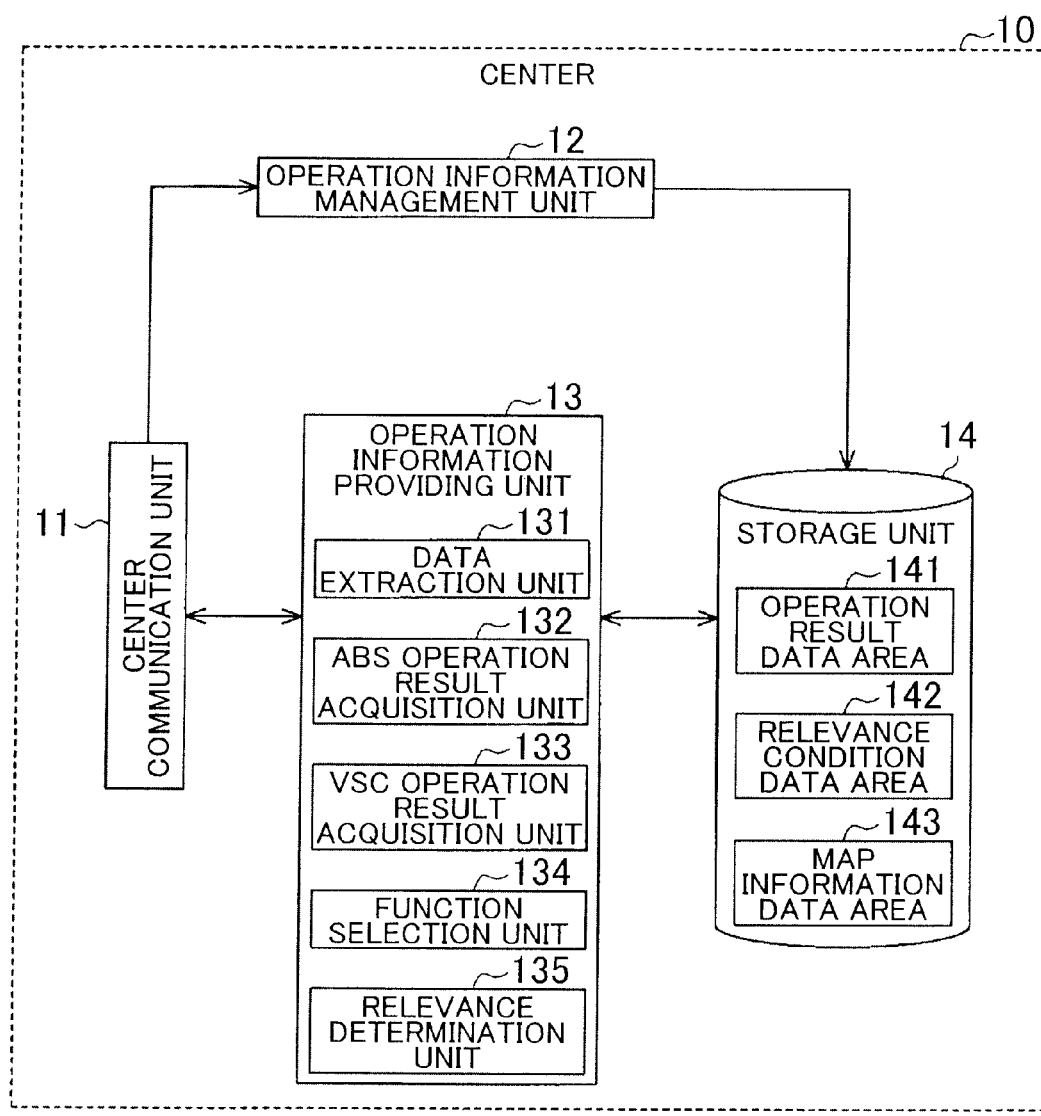
FIG. 3 is a block diagram schematically showing a general configuration of a center according to the embodiment.

Moreover, the assistance unit 223 may use an ABS operation result and a VSC operation result retained in the operation information data area 231 of the storage unit 23 of the host vehicle as assistance information. As shown in FIG. 3, at the center 10, the center communication unit 11 is connected to both the operation information management unit 12 and the operation information providing unit 13 so as to be capable of transmitting information. The center 10 includes a storage unit 14 that retains various types of information including ABS operation results and VSC operation results. The operation information management unit 12 and the operation information providing unit 13 are respectively connected to the storage unit 14 so as to be capable of at least one of reading and writing information.

The storage unit 14 is constituted by all of or a part of a storage area provided in a conventional storage apparatus. The storage area includes an operation result data area 141, a relevance condition data area 142, and a map information data area 143. The operation result data area 141 stores the ABS operation result and the VSC operation result acquired from the provider vehicle 20A. The relevance condition data area 142 stores conditions required for determining a relevance between an ABS operation result and a VSC operation result and a determination result of the relevance between an ABS operation result and a VSC operation result. The map information data area 143 stores map information including road information. The operation result data area 141 need only enable adding, reading, deleting, and the like of the respective operation results and may be constituted by a so-called data base.

ABS operation results and VSC operation results provided by the provider vehicles 20A to 20D are inputted to the operation information management unit 12 via the center communication unit 11. The operation information management unit 12 causes inputted ABS operation results and VSC operation results to be additionally stored in the operation result data area 141. Moreover, the operation information management unit 12 may delete operation results that are no longer necessary due to being outdated or the like from the operation result data area 141.

The operation information providing unit 13 receives an assistance information request signal from the provider vehicles 20A to 20D, the user vehicle 30, and the like. In addition, based on the position information included in the received assistance information request signal, the operation information providing unit 13 selects and acquires an ABS operation result and a VSC operation result from the storage unit 14 and outputs the acquired operation results to the vehicle having outputted the assistance information request signal.

The operation information providing unit 13 includes a data extraction unit 131 configured to extract an operation result based on position information, an ABS operation result acquisition unit 132 configured to only acquire ABS operation results, and a VSC operation result acquisition unit 133 configured to only acquire VSC operation results. In addition, the operation information providing unit 13 includes a function selection unit 134 configured to set an operation result to be selected and a relevance determination unit 135 configured to determine whether or not an ABS operation result is related to a VSC operation result.

Based on the position information included in the received assistance information request signal, the data extraction unit 131 selects and acquires the position information as well as an ABS operation result and a VSC operation result associated with a vicinity of the position information from the operation result data area 141.

Based on an instruction from the function selection unit 134, the ABS operation result acquisition unit 132 acquires only an ABS operation result from the respective operation results acquired by the data extraction unit 131 and outputs the acquired ABS operation result to the vehicle having outputted the assistance information request signal.

Based on an instruction from the function selection unit 134, the VSC operation result acquisition unit 133 acquires only a VSC operation result from the respective operation results acquired by the data extraction unit 131 and outputs the acquired VSC operation result to the vehicle having outputted the assistance information request signal.

Based on a vehicle attribute included in the assistance information request signal, the function selection unit 134 determines a type of assistance information to be provided to the vehicle having outputted the assistance information request signal or, in other words, whether or not to provide an ABS operation result and whether or not to provide a VSC operation result to the vehicle having outputted the assistance information request signal.

When the function selection unit 134 determines, based on the vehicle attribute included in the assistance information request signal, that the vehicle having outputted the assistance information request signal is mounted with an ABS, the function selection unit 134 instructs the ABS operation result acquisition unit 132 to return the ABS operation result.

On the other hand, when the function selection unit 134 determines, based on the vehicle attribute included in the assistance information request signal, that the vehicle having outputted the assistance information request signal is mounted with a VSC, the function selection unit 134 instructs the VSC operation result acquisition unit 133 to return the VSC operation result.

Furthermore, in the embodiment, based on the vehicle attribute included in the assistance information request signal, the function selection unit 134 determines whether or not the vehicle having outputted the assistance information request signal is mounted with an ABS and not mounted with a VSC. When the function selection unit 134 determines that the vehicle is mounted with an ABS and not mounted with a VSC, the function selection unit 134 instructs the VSC operation result acquisition unit 133 to return the VSC operation result when the relevance determination unit 135 determines that the ABS operation result is related to the VSC operation result. In other words, the function selection unit 134 does not instruct the VSC operation result acquisition unit 133 to return the VSC operation result when the function selection unit 134 does not determine that the vehicle having is mounted with an ABS and not mounted with a VSC or when the relevance determination unit 135 determines that the ABS operation result is not related to the VSC operation result.

The relevance determination unit 135 determines whether or not an ABS operation result is related to a VSC operation result with respect to vehicles determined by the function selection unit 134 to be mounted with an ABS and not mounted with a VSC. Whether not an ABS operation result is related to a VSC operation result may be determined based on determination criteria set according to various indices and statistical methods.

For example, based on statistical data showing that a vehicle (driver) on which an ABS has been operated a large number of times has also operated a VSC a large number of times, it is conceivable that a VSC is highly likely to be operated on a vehicle (driver) on which an ABS is operated a large number of times. Accordingly, the relevance determination unit 135 determines whether or not an ABS operation result is related to a VSC operation result with respect to an object vehicle (driver) based on whether or not the number of ABS operations performed by the object vehicle (driver) is large. The operation result data area 141 of the center 10 retains ABS operation results acquired from the provider vehicles 20A to 20D and the user vehicle 30. Therefore, based on the ABS operation results retained in the operation result data area 141, the relevance determination unit 135 may rank the numbers of ABS operations of the respective vehicles and determine whether or not the number of ABS operations of the object vehicle (the user vehicle 30) is ranked high (placed high in the rankings). Alternatively, the relevance determination unit 135 may determine whether or not the number of ABS operations performed by the object vehicle is large by calculating an average value of the number of operations per vehicle with respect to the ABS operation results retained in the operation result data area 141 and comparing the average value of the number of operations with the number of ABS operations performed by the object vehicle.

It may be conceivable that the function selection unit 134 instructs the VSC operation result acquisition unit 133 to return the VSC operation result based on the position information of the object vehicle without a determination of relevance by the relevance determination unit 135. In this case, the center 10 returns the VSC operation result to a vehicle mounted with an ABS and not mounted with a VSC without determining whether or not the ABS operation result is related to the VSC operation result. A vehicle mounted with a VSC is capable of eliminating unnecessary VSC operation results by determining whether or not the acquired VSC operation result conforms to conditions that apply when the VSC is operated on the vehicle or, in other words, by performing so-called filtering. However, a vehicle not mounted with a VSC is normally not equipped with a configuration nor information for determining whether or not the acquired VSC operation result conforms to conditions that apply when the VSC is operated on the vehicle or, in other words, for performing filtering. There is a risk that sufficient driving assistance cannot be performed when such a vehicle completely disregards the acquired VSC operation result. On the other hand, if such a vehicle fully utilizes the acquired VSC operation result, there is a risk that unnecessary driving assistance may end up being performed a large number of times and may cause the driver to feel inconvenienced. Therefore, in the embodiment, the relevance determination unit 135 determines whether or not a VSC operation result is available so that an object vehicle can perform appropriate driving assistance based on the VSC operation result without having to determine whether or not a VSC operation result is available.

Figure 4:
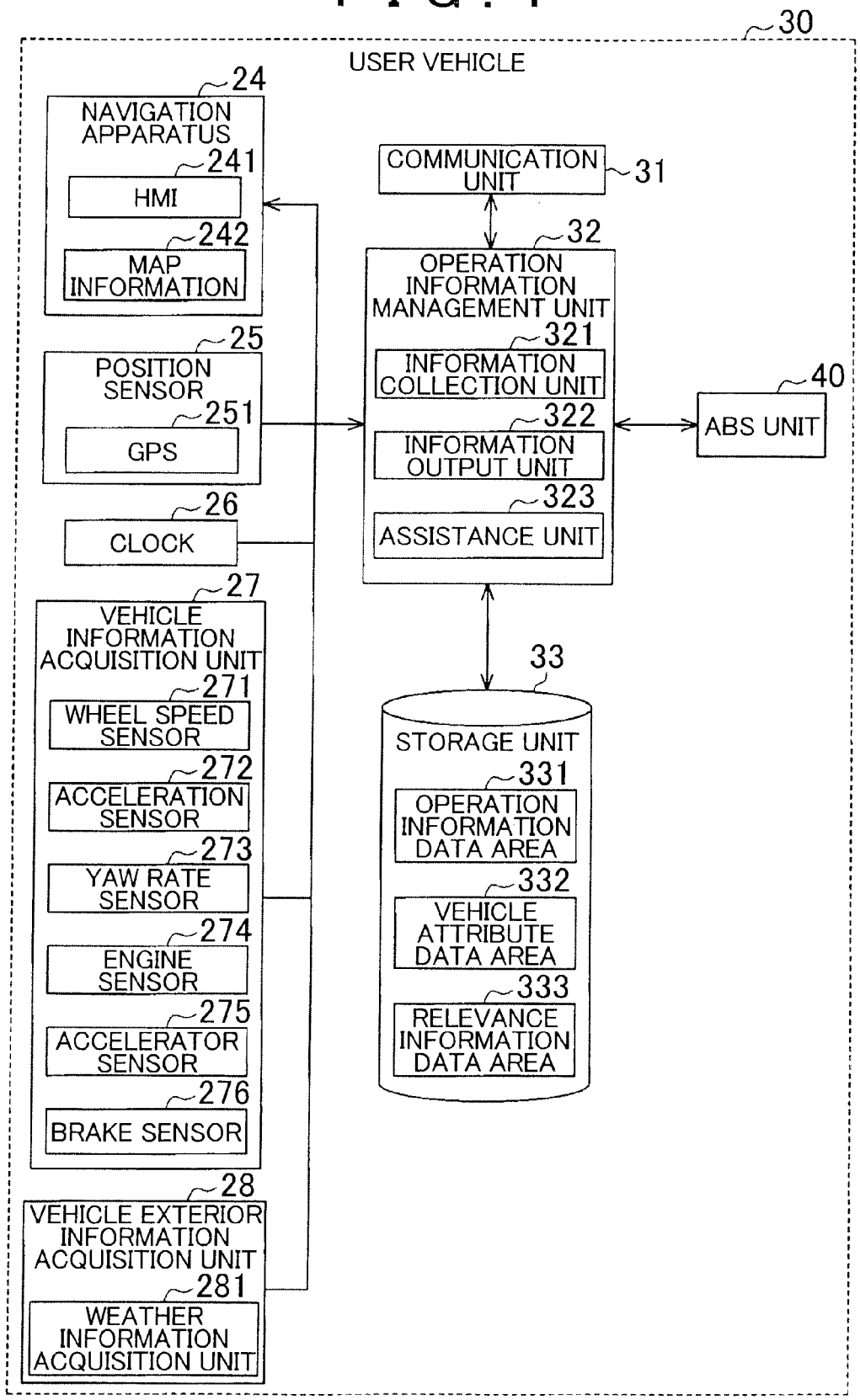
FIG. 4 is a block diagram schematically showing a general configuration of a vehicle that uses an operation result of a driving assistance apparatus according to the embodiment.

As shown in FIG. 4, the user vehicle 30 includes an operation information management unit 32 configured to manage ABS operation information together with vehicle information and vehicle exterior information, and a storage unit 33 configured to retain various types of information managed by the operation information management unit 32. The operation information management unit 32 is connected to the ABS unit 40 and the vehicle mounted communication unit 31 so that information can be mutually transmitted. In addition, the operation information management unit 32 is connected to the storage unit 33 so as to be capable of reading and writing various types of information.

In addition, the user vehicle 30 includes a navigation apparatus 24, a position sensor 25, a clock 26, a vehicle information acquisition unit 27, and a vehicle exterior information acquisition unit 28 which share the same configurations as those of the provider vehicle 20A. The navigation apparatus 24, the position sensor 25, the clock 26, the vehicle information acquisition unit 27, and the vehicle exterior information acquisition unit 28 are respectively connected to the operation information management unit 32 so that various types of retained information can be respectively transmitted.

The operation information management unit 32 includes an information collection unit 321 configured to generate an ABS operation result and to cause the storage unit 33 to retain the generated ABS operation result, and an information output unit 322 configured to output the ABS operation result retained in the storage unit 33 to the center 10 and the like via the vehicle mounted communication unit 31. In addition, the operation information management unit 32 includes an assistance unit 323 configured to receive the ABS operation result and a VSC operation result as assistance information and to perform driving assistance based on the received assistance information.

The storage unit 33 has the same configuration as the storage unit 23 of the provider vehicle 20A and a storage area of the storage unit 33 includes an operation information data area 331, a vehicle attribute data area 332, and a relevance information data area 333. The operation information data area 331 stores ABS operation results written by the information collection unit 321, and stored ABS operation results are read by the information output unit 322. The operation information data area 331 need only enable adding, reading, deleting, and the like of ABS operation results and may be constituted by a so-called data base. The vehicle attribute data area 332 includes information for specifying a host vehicle, information indicating vehicle specifications such as a vehicle type, information indicating a type of a mounted assistance apparatus (for example, an ABS or a VSC), and the like. In other words, the vehicle attribute data area 332 stores information indicating whether or not an ABS is mounted.

The information collection unit 321 generates information that associates various types of vehicle information and various types of vehicle exterior information with ABS operation information as an ABS operation result in a similar manner to the information collection unit 221 of the provider vehicle 20A. The ABS operation information is information which is obtained from the ABS unit 40 and which indicates that the ABS has been operated. In addition, the information collection unit 321 writes the generated ABS operation result into the operation information data area 331 or, in other words, causes the operation information data area 331 to additionally store the generated ABS operation result. Furthermore, the ABS operation result created by the information collection unit 321 includes information such as position information, operation information, time, speed, and weather as well as vehicle information, vehicle exterior information, and other necessary information in a similar manner to the ABS operation result generated by the information collection unit 221 (refer to FIG. 5). In this manner, an ABS operation result is generated based on an actual travel of the user vehicle 30.

The information output unit 322 reads ABS operation results stored in the operation information data area 331 of the storage unit 33 and outputs each of the read operation results to the center 10. Moreover, since the information output unit 322 has the same configuration as the information collection unit 221 of the provider vehicle 20A with the exception of the information output unit 322 only handing ABS operation results, a detailed description will be omitted.

In addition, the assistance unit 323 has the same configuration as the assistance unit 223 of the provider vehicle 20A. The assistance unit 323 acquires an ABS operation result or a VSC operation result from the center 10 as assistance information in response to an assistance information request signal outputted to the center 10, and performs driving assistance including notifying the driver based on the acquired assistance information. Moreover, the assistance unit 323 may determine whether or not the vehicle information or the vehicle exterior information included in the ABS operation result is similar to the current vehicle information or vehicle exterior information of the host vehicle, and may perform driving assistance based on the operation result when the information is similar. Furthermore, when the operation information data area 231 retains an ABS operation result that is similar to the ABS operation result acquired from the center 10, the assistance unit 223 may perform driving assistance based on the operation result. Accordingly, since ABS operation results acquired from the center 10 can be appropriately filtered, driving assistance which is unsuitable for the host vehicle and which may cause the driver to feel inconvenienced is prevented and driving assistance is performed effectively.

However, since the user vehicle 30 that is not mounted with a VSC does not retain VSC operation results, the user vehicle 30 is unable to determine similarities between the vehicle information, the vehicle exterior information, and the VSC operation result included in the assistance information acquired from the center 10 and the retained vehicle information, vehicle exterior information, and VSC operation result. In the embodiment, the VSC operation result that is returned to the user vehicle 30 from the center 10 is a VSC operation result determined to be related to the ABS operation result of the user vehicle 30. Therefore, even when driving assistance is performed based on a VSC operation result acquired from the center 10, driving assistance which is suitable for the user vehicle and which is less likely to inconvenience the driver is performed.

Figure 6:
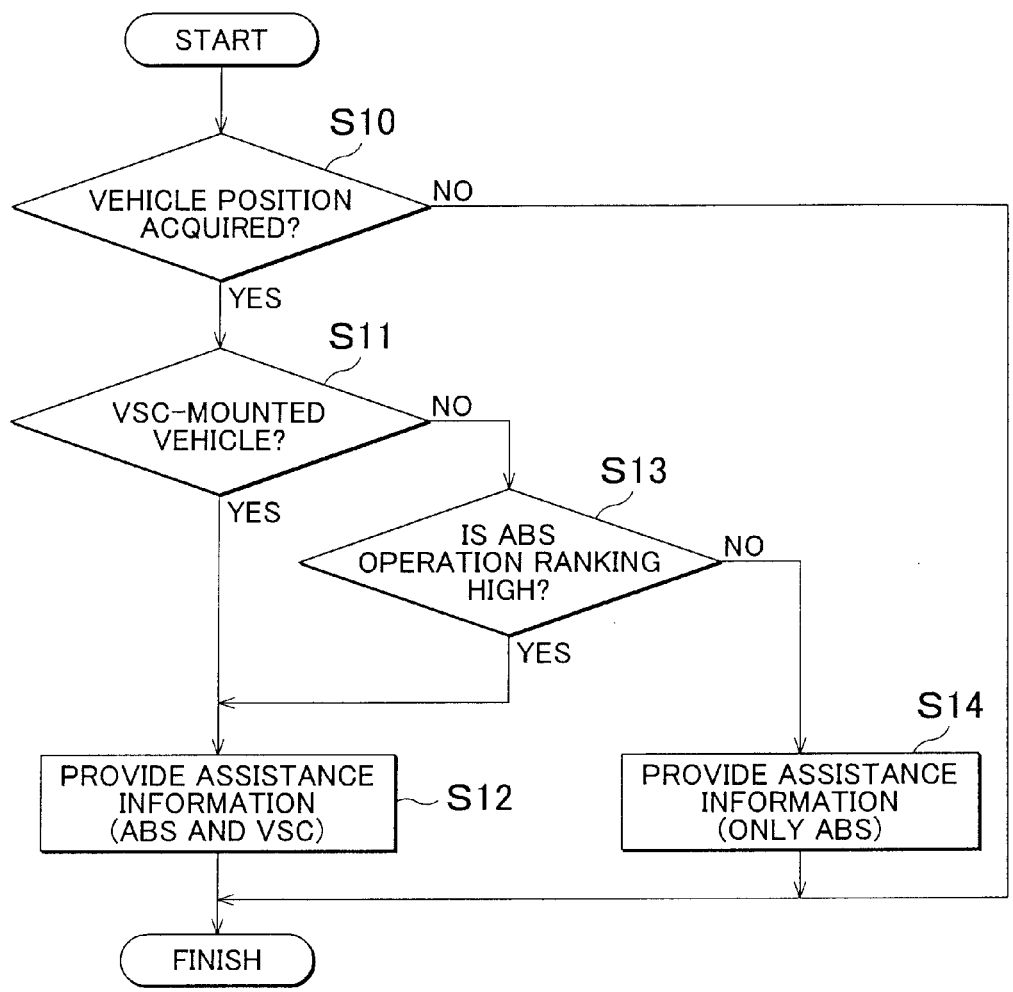
FIG. 6 is a flow chart showing an example of a procedure for providing an operation result of driving assistance at a center according to the embodiment.

Operations will now be described. First, when the user vehicle 30 outputs an assistance information request signal to the center 10, the center 10 having received the assistance information request signal starts a process of providing assistance information in accordance with the received assistance information request signal. FIG. 6 shows a procedure of a process of providing assistance information by the center 10.

As shown in FIG. 6, in the process of providing assistance information, the center 10 determines whether or not position information can be acquired from the assistance information request signal (step S10 in FIG. 6). The center 10 acquires position information from the assistance information request signal using the data extraction unit 131 of the operation information providing unit 13. When it is determined that position information cannot be acquired (NO in step S10 in FIG. 6), the center 10 terminates a process of notifying assistance information. On the other hand, when it is determined that position information can be acquired (YES in step S10 in FIG. 6), the center 10 determines whether or not the user vehicle 30 is mounted with a VSC (step S11 in FIG. 6). The center 10 determines whether or not the user vehicle 30 is mounted with a VSC based on whether or not information indicating that a VSC is mounted is included in vehicle attribute information that is included in the assistance information request signal.

When it is determined that a VSC is mounted (YES in step S11 in FIG. 6), the center 10 returns assistance information including an ABS operation result and a VSC operation result to the user vehicle 30 having outputted the assistance information request signal (step S12 in FIG. 6) and terminates the process of providing assistance information.

On the other hand, when it is determined that a VSC is not mounted (NO in step S11 in FIG. 6), the center 10 determines whether or not the number of ABS operations by the user vehicle 30 is placed high in the rankings or, in other words, whether or not the ABS operation result is related to the VSC operation result (step S13 in FIG. 6). For example, when the number of ABS operations by the user vehicle 30 is placed higher in the rankings than the numbers of ABS operations by other vehicles and is in, for example, the top 20% to 30% of the rankings, it is determined that the ABS operation result of the user vehicle 30 is highly related to the VSC operation result.

When it is determined that the ABS operation result of the user vehicle 30 is highly related to the VSC operation result (YES in step S13 in FIG. 6), the center 10 returns assistance information including an ABS operation result and a VSC operation result to the user vehicle 30 having outputted the assistance information request signal (step S12 in FIG. 6) and terminates the process of providing assistance information. Conversely, when it is determined that the ABS operation result of the user vehicle 30 is not highly related to the VSC operation result (NO in step S13 in FIG. 6), the center 10 returns assistance information only including an ABS operation result to the user vehicle 30 having outputted the assistance information request signal (step S14 in FIG. 6) and terminates the process of providing assistance information.

Accordingly, the user vehicle 30 can acquire assistance information from the center 10. In addition, the user vehicle 30 determines whether ABS operation results are necessary or not and performs driving assistance based on necessary ABS operation results. On the other hand, when the user vehicle 30 acquires a VSC operation result, the user vehicle 30 performs driving assistance based on the acquired VSC operation result without determining whether or not the acquired VSC operation result is necessary. Therefore, even when the user vehicle 30 is mounted with an ABS but not with a VSC, driving assistance based on a. VSC operation result is performed in addition to driving assistance based on an ABS operation result. Furthermore, the center 10 returns the VSC operation result only when it is determined that the VSC operation result has relevance to the ABS operation result. Therefore, even if the user vehicle 30 performs driving assistance based on the VSC operation result returned from the center 10, the user vehicle 30 can reduce the risk of the driver being inconvenienced by the driving assistance.

In addition, since the user vehicle 30 does not perform unnecessary driving assistance and does not have to determine whether or not the VSC operation result is necessary, processing load can also be reduced. As described above, with the driving assistance system and the driving assistance method according to the embodiment, the operational effects described below can be achieved.

When there is relevance between a VSC operation result and an ABS operation result, driving assistance based on the VSC operation result is performed by the user vehicle 30 in which driving assistance is performed by an ABS. In other words, when there is relevance between a VSC operation result and an ABS operation result, driving assistance based on the VSC operation result is performed by the user vehicle 30 regardless of whether or not a VSC operation is performed by the user vehicle 30. Accordingly, even when a VSC of a vehicle is inoperative or a vehicle is not mounted with a VSC, as long as the vehicle performs driving assistance by an ABS, the vehicle is also capable of receiving driving assistance based on a VSC operation result. In addition, since driving assistance based on a VSC operation result is performed when the ABS operation result is related to the VSC operation result, such driving assistance has a low risk of inconveniencing the driver. Accordingly, greater driving assistance can be provided more effectively.

Although the user vehicle 30 does not perform driving assistance by a VSC, driving assistance based on a VSC operation result is performed based on the relevance between an ABS operation result and the VSC operation result. Accordingly, the user vehicle 30 can receive greater driving assistance.

There is no guarantee that a vehicle is mounted with both a so-called ABS that is an assistance apparatus for preventing a wheel from locking during braking and a so-called VSC that is an assistance apparatus for preventing the vehicle from skidding and stabilizing the vehicle or that the assistance apparatuses are both operative even when mounted.

However, even if the user vehicle 30 according to the embodiment is not mounted with a VSC (or even if the user vehicle 30 is mounted with a VSC that is inoperative), the user vehicle 30 is capable of performing driving assistance using a VSC operation result as long as the user vehicle 30 is mounted with an ABS. Accordingly, greater driving assistance can be provided more effectively.

The storage unit 14 and the relevance determination unit 135 are provided at the center 10 that is outside the vehicle. Accordingly, the storage unit 14 can readily collect operation results from a plurality of VSC units 50 and the relevance determination unit 135 can determine a relevance between an ABS operation result and a VSC operation result based on the large number of operation results. Accordingly, greater driving assistance can be provided more effectively.

The operation information providing unit 13 selects only a VSC operation result related to an ABS operation result from VSC operation results as assistance information to be provided to the user vehicle 30, and only the selected VSC operation result is provided to the user vehicle 30. As a result, a processing load of transmission of assistance information and a processing load on the user vehicle 30 to which the information is transmitted are reduced.

With the user vehicle 30, driving assistance based on a VSC operation result is performed at an operation position where driving assistance is performed by a VSC. As a result, driving assistance is suitably performed with respect to a position that requires driving assistance.

Second Embodiment

A second embodiment of a driving assistance system will now be described with reference to FIGS. 7 to 10.

A configuration of the embodiment differs from the configuration of the first embodiment which determines relevance in that a condition regarding driving characteristics has been added to the determination conditions of relevance. Otherwise, the configuration of the embodiment is similar to that of the first embodiment. In consideration thereof, only components that differ from those of the first embodiment will be described. Similar components will be denoted by similar reference numerals and a detailed description thereof will be omitted.

Figure 7:
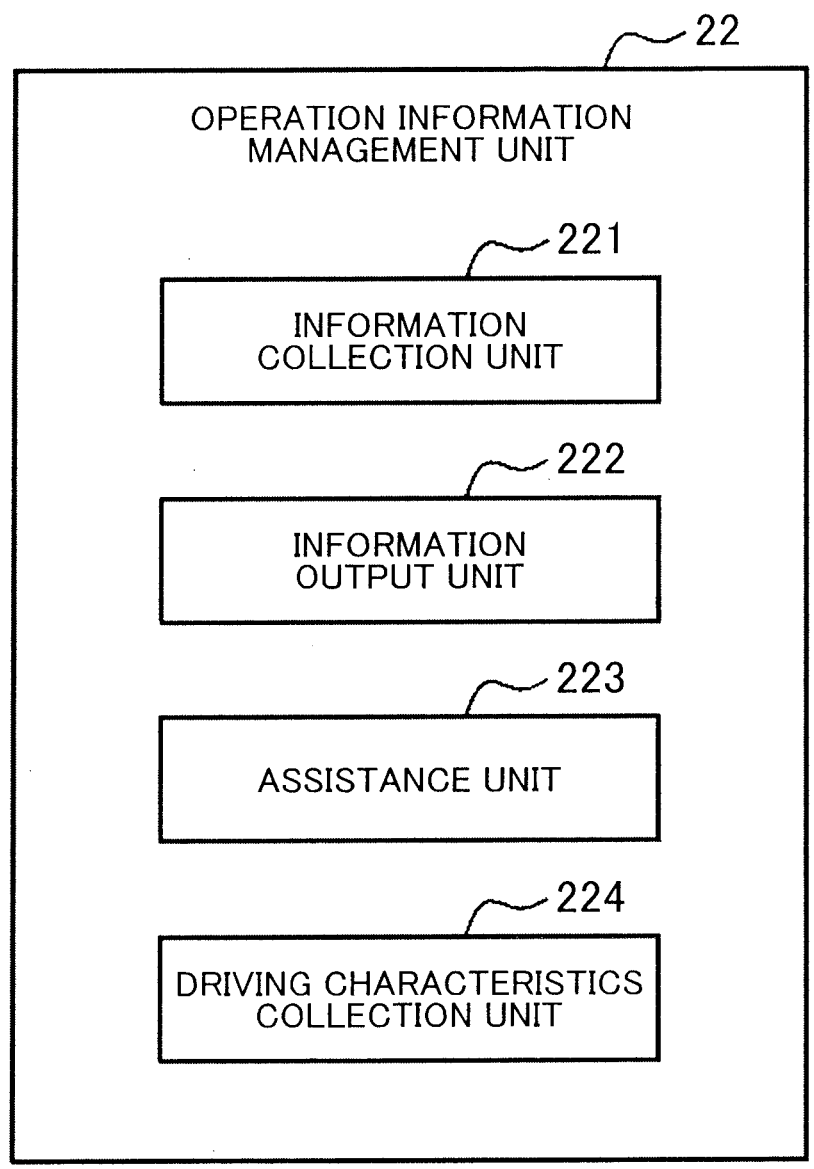
FIG. 7 is a block diagram showing a general configuration of an operation information management unit of a vehicle provided with an operation result of a driving assistance apparatus according to a second embodiment of a driving assistance system.

As shown in FIG. 7, the provider vehicle 20A includes a driving characteristics collection unit 224 in the operation information management unit 22. The driving characteristics collection unit 224 collects information indicating characteristics of driving operations by the driver and generates driving characteristics information based on the collected information. The driving characteristics collection unit 224 generates driving characteristics information for determining tendencies of a driver so as to include necessary information among information such as an operation frequency and an operation amount of accelerator operations, an operation frequency and an operation amount of brake operations, an operation frequency and an operation amount of steering operations, a variation in speed, a variation in acceleration, and a variation in yaw rate. In addition, the driving characteristics collection unit 224 causes the storage unit 23 or the like to retain the generated driving characteristics information. Moreover, the driving characteristics information may include information other than those described above.

Figure 8:
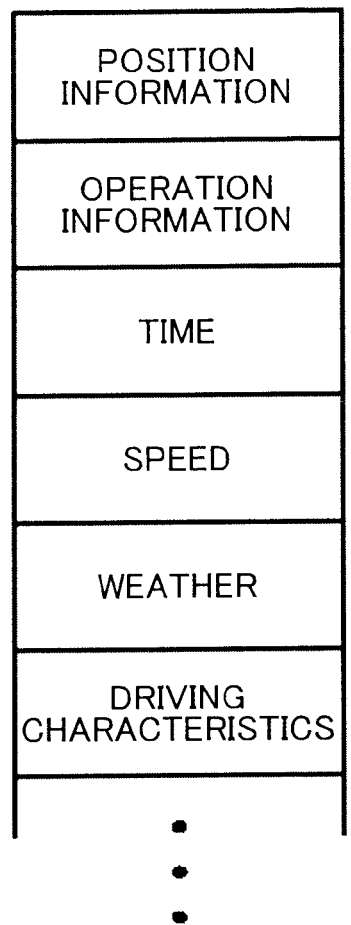
FIG. 8 is a schematic diagram that schematically illustrates information included in an operation result according to the embodiment.

As shown in FIG. 8, when the information output unit 222 outputs an ABS operation result or a VSC operation result stored in the storage unit 23 to the center 10, the information output unit 222 adds the driving characteristics information retained in the storage unit 23 to the ABS operation result or the VSC operation result to be outputted. Moreover, since the driving characteristics information may be sent to the center 10 after being associated with the ABS operation result or the VSC operation result, the driving characteristics information may be added to the ABS operation result or the VSC operation result when the information collection unit 221 generates the ABS operation result or the VSC operation result.

Figure 9:
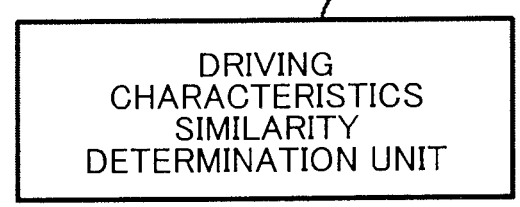
FIG. 9 is a block diagram showing a portion that determines a similarity of driving characteristics at a center according to the embodiment.

As shown in FIG. 9, the center 10 further includes a driving characteristics similarity determination unit 136 in the operation information providing unit 13. Accordingly, when driving characteristics information is included in the assistance information request signal that is notified to the center 10, with respect to the ABS operation result and the VSC operation result selected based on the current position, the center 10 determines whether or not the driving characteristics information included in the operation results is similar to the driving characteristics information included in the assistance information request signal.

In other words, the center 10 is capable of limiting assistance information to be returned to the user vehicle 30 to only the ABS operation result and the VSC operation result having driving characteristics information that is similar to the driving characteristics information included in the assistance information request signal. In this manner, the ABS operation result and the VSC operation result having driving characteristics information that is similar to the driving characteristics information of the user vehicle 30 are returned to the user vehicle 30. Accordingly, the user vehicle 30 is capable of performing driving assistance based on the assistance information constituted by operation results having driving characteristics that are similar to the driving characteristics information of the user vehicle 30. As a result, the user vehicle 30 can perform more effective driving assistance in accordance with the driving characteristics of the driver.

Figure 10:
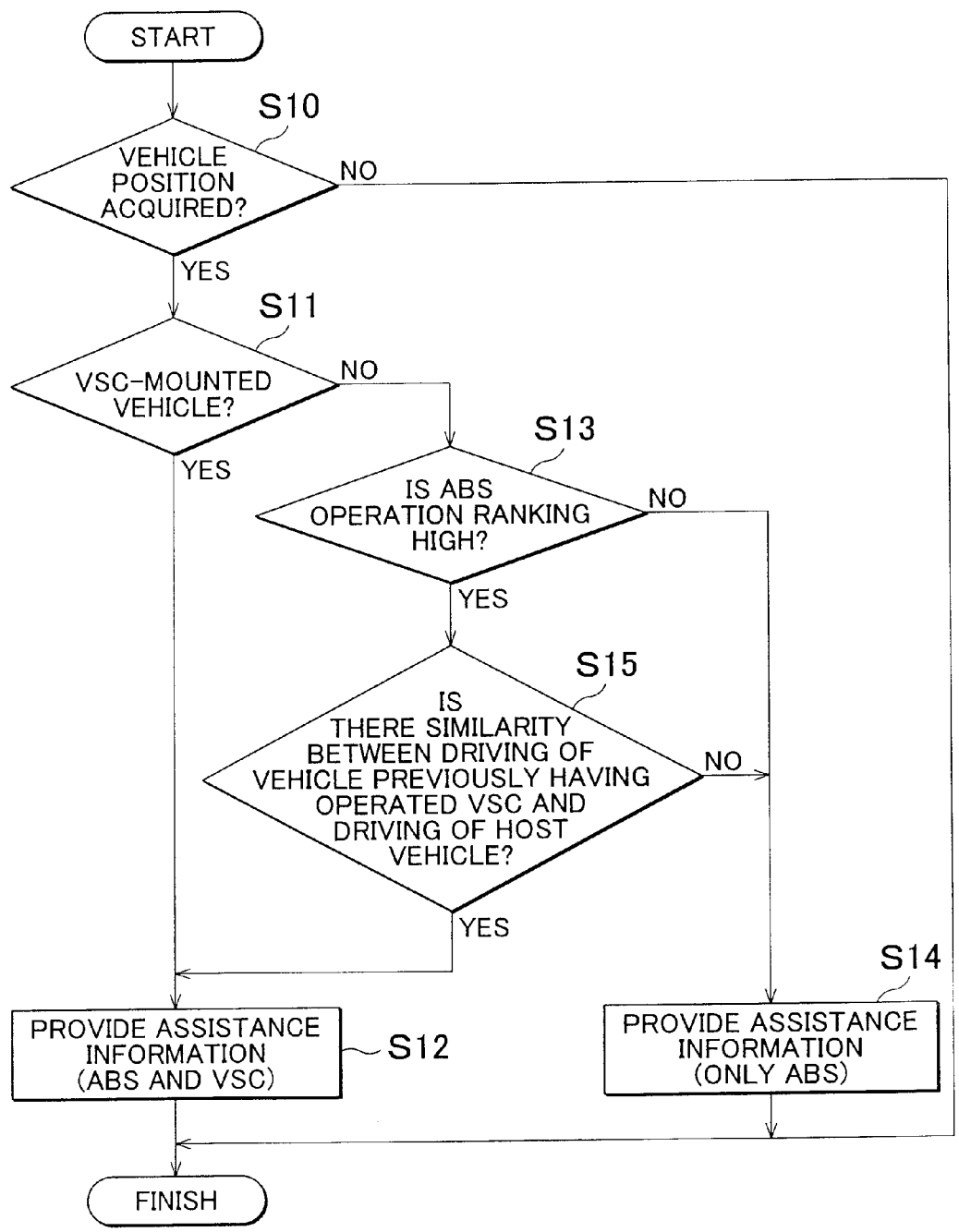
FIG. 10 is a flow chart showing an example of a procedure for providing an operation result of driving assistance at a center according to the embodiment.

Operations of the embodiment will now be described. First, when the user vehicle 30 outputs an assistance information request signal including driving characteristics information to the center 10, the center 10 having received the assistance information request signal starts a process of providing assistance information in accordance with the received assistance information request signal. FIG. 10 shows a procedure of a process of providing assistance information by the center 10. Moreover, since steps S11 to S14 shown in FIG. 10 are processes similar to those of steps S11 to S14 shown in FIG. 6 according to the first embodiment, a detailed description thereof will be omitted.

As shown in FIG. 10, in the process of providing assistance information, when the center 10 is able to acquire position information from the assistance information request signal (YES in step S10 in FIG. 10), the center 10 determines whether or not the user vehicle 30 is mounted with a VSC (step S11 in FIG. 10). If the user vehicle 30 is mounted with a VSC (YES in step S11 in FIG. 10), the center 10 returns assistance information including an ABS operation result and a VSC operation result to the user vehicle 30 (step S12 in FIG. 10) and terminates the process of providing assistance information.

On the other hand, when the center. 10 determines that the user vehicle 30 is not mounted with a VSC (NO in step S11 in FIG. 10), the center 10 determines whether or not the number of ABS operations by the user vehicle 30 is placed high in the rankings (step S13 in FIG. 10). When the number of ABS operations by the user vehicle 30 is not placed high in the rankings (NO in step S13 in FIG. 10), the center 10 returns assistance information only including an ABS operation result to the user vehicle 30 (step S14 in FIG. 10) and terminates the process of providing assistance information.

When the number of ABS operations by the user vehicle 30 is placed high in the rankings (YES in step S13 in FIG. 10), the center 10 determines whether or not driving of a vehicle that had previously operated a VSC is similar to driving of the user vehicle 30 (step S15 in FIG. 10). Similarity is determined based on a comparison between driving characteristics information included in the selected VSC operation result and driving characteristics information included in the assistance information request signal. When it is determined that the driving characteristics information has similarity (YES in step S15 in FIG. 10), the center 10 returns assistance information including an ABS operation result and a VSC operation result to the user vehicle 30 (step S12 in FIG. 10) and terminates the process of providing assistance information.

On the other hand, when it is determined that the driving characteristics information does not have similarity (NO in step S15 in FIG. 10), the center 10 returns assistance information only including an ABS operation result to the user vehicle 30 (step S14 in FIG. 10) and terminates the process of providing assistance information.

Accordingly, only a VSC operation result to which is associated driving characteristics information similar to the driving characteristics information of the user vehicle 30 is returned to the user vehicle 30. In addition, by providing driving assistance based on the received VSC operation result, the user vehicle 30 can provide driving assistance suitable to the driving characteristics of the driver. In other words, driving assistance that is less likely to cause discomfort or inconvenience in the driver can be provided.

As described above, with the driving assistance system and the driving assistance method according to the embodiment, the operational effects described below can be achieved in addition to those described earlier in the first embodiment.

Since the determination of whether or not an ABS operation result is related to a VSC operation result is performed in consideration of a similarity between driving characteristics information of the user vehicle 30 and driving characteristics information of a VSC operation result, driving assistance suitable to a user can be performed. Accordingly, driving assistance can be provided more effectively.

Third Embodiment

A third embodiment of a driving assistance system will now be described with reference to FIGS. 11 and 12.

A configuration of the embodiment differs from the configuration of the operation information management unit of the provider vehicle according to first embodiment in that the operation information management unit of the user vehicle includes a driving characteristics collection unit and a driving characteristics comparison unit. Otherwise, the configuration of the embodiment is similar to that of the first embodiment. In consideration thereof, only components that differ from those of the first embodiment will be described. Similar components will be denoted by similar reference numerals and a detailed description thereof will be omitted.

Figure 11:
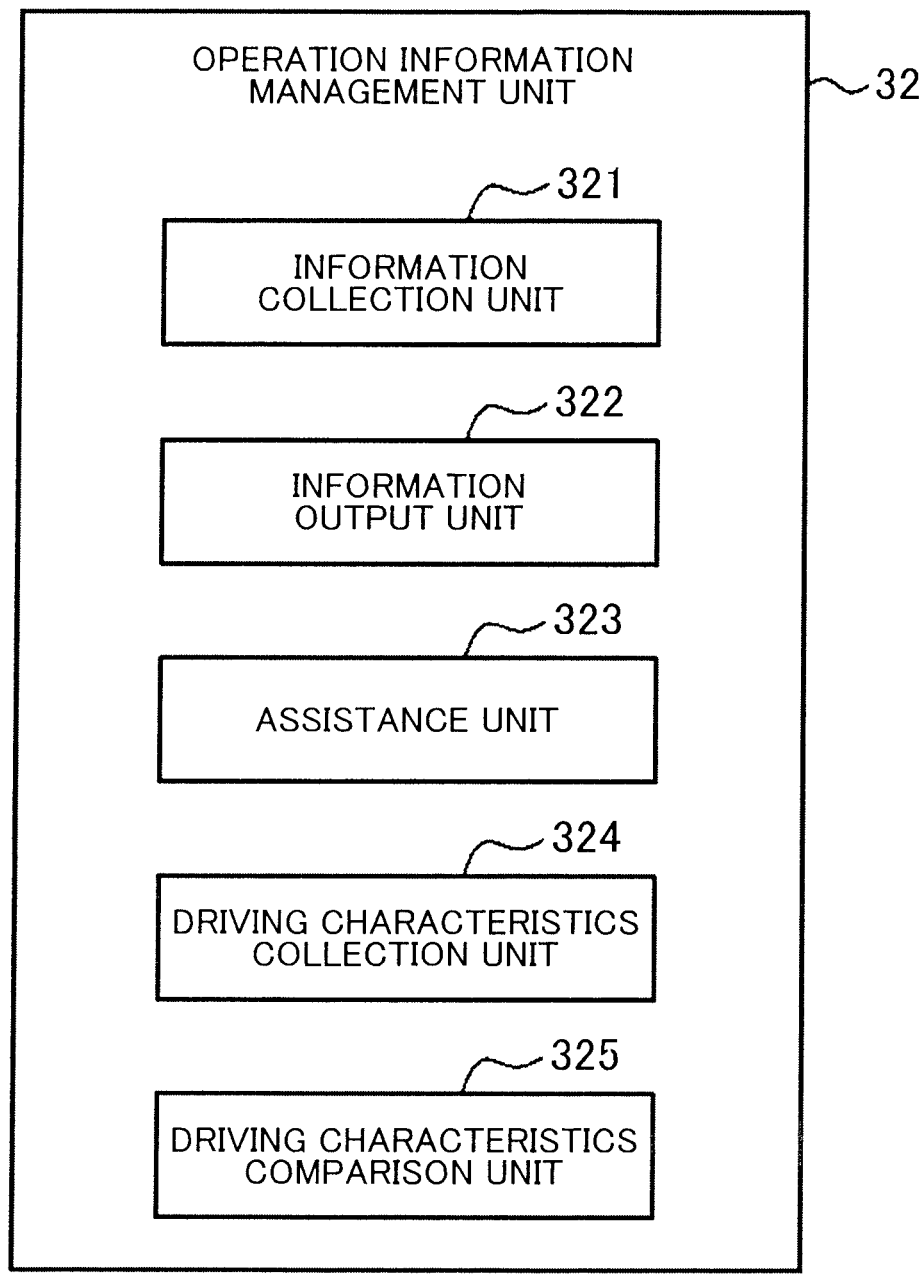
FIG. 11 is a block diagram showing a general configuration of an operation information management unit of a vehicle that uses an operation result of a driving assistance apparatus according to a third embodiment of a driving assistance system.

As shown in FIG. 11, the operation information management unit 32 of the user vehicle 30 includes an information collection unit 321, an information output unit 322, an assistance unit 323, a driving characteristics collection unit 324, and a driving characteristics comparison unit 325. The driving characteristics collection unit 324 has the same configuration as the driving characteristics collection unit 224 provided in the provider vehicle 20A according to the second embodiment. In addition, the driving characteristics comparison unit 325 has the same configuration as the driving characteristics similarity determination unit 136 provided in the center 10 according to the second embodiment. Moreover, when the assistance unit 323 performs driving assistance based on a VSC operation result acquired from the center 10, the assistance unit 323 determines similarity by comparing driving characteristics information included in the VSC operation result with driving characteristics information of the user vehicle 30. In addition, the assistance unit 323 performs driving assistance based on a VSC operation result including driving characteristics information similar to the driving characteristics information of the user vehicle 30. Moreover, it is assumed that driving characteristics information is added to the VSC operation result in a form such as that described in the second embodiment.

A procedure of driving assistance based on a VSC operation result by the assistance unit 323 will now be described. First, when the user vehicle 30 outputs an assistance information request signal to the center 10, the center 10 having received the assistance information request signal starts a process of providing assistance information in accordance with the received assistance information request signal. Subsequently, based on the assistance information that is returned from the center 10, the user vehicle 30 determines whether or not driving assistance based on the assistance information is to be performed. FIG. 12 shows a procedure of a process of performing driving assistance by the user vehicle 30.

When the user vehicle 30 acquires assistance information, the user vehicle 30 periodically monitors whether or not the user vehicle 30 approaches an ABS operation position and a VSC operation position that are included in the assistance information. Moreover, only a procedure with respect to a VSC operation result will be described, and a description of a procedure with respect to an ABS operation result will be omitted.

Figure 12:
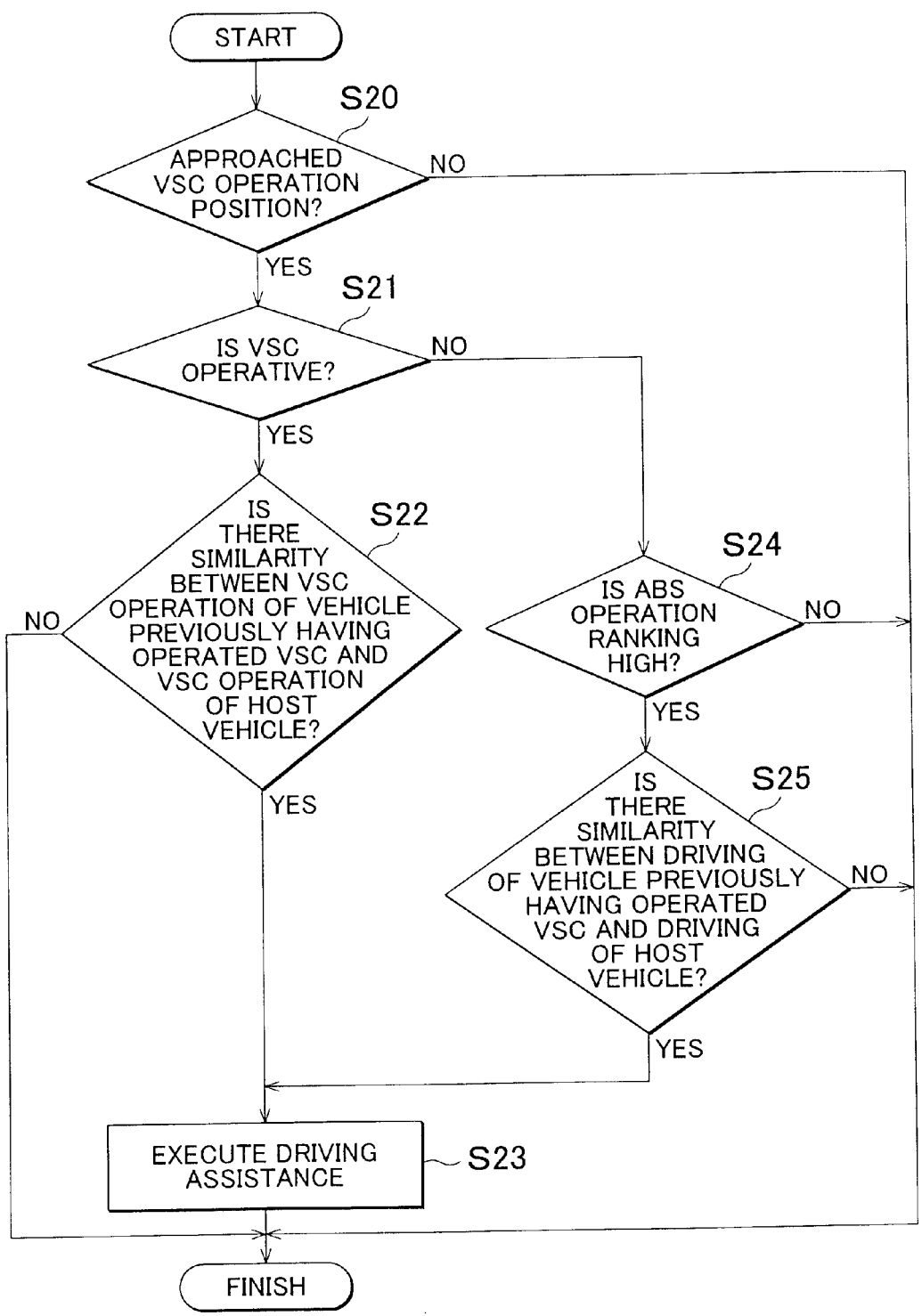
FIG. 12 is a flow chart showing an example of a procedure for providing an operation result of driving assistance at a vehicle that uses an operation result of a driving assistance apparatus according to the embodiment.

When driving assistance based on assistance information is started, the user vehicle 30 determines whether or not a current position of the user vehicle 30 has approached a VSC operation position (step S20 in FIG. 12). Specifically, the assistance unit 323 determines whether or not a distance from the current position of the user vehicle 30 to the VSC operation position is equal to or less than a prescribed distance. When it is determined that the current position of the user vehicle 30 has not approached the VSC operation position (NO in step S20 in FIG. 12), the user vehicle 30 terminates the process of driving assistance based on the assistance information. In other words, driving assistance based on the VSC operation result is not performed.

On the other hand, when it is determined that the current position of the user vehicle 30 has approached the VSC operation position (YES in step S20 in FIG. 12), the user vehicle 30 determines whether or not a VSC is operative in the user vehicle 30 (step S21 in FIG. 12). Since the user vehicle 30 is not mounted with a VSC, it is determined that the VSC is inoperative. Alternatively, the VSC may be determined to be inoperative when a VSC is mounted but does not operate normally.

When it is determined that the VSC is inoperative in the user vehicle 30 (NO in step S21 in FIG. 12), the user vehicle 30 determines whether or not the number of ABS operations by the user vehicle 30 is placed high in the rankings (step S24 in FIG. 12). In addition, when the number of ABS operations is not placed high in the rankings (NO in step S24 in FIG. 12), the user vehicle 30 terminates the process of driving assistance based on the assistance information. In other words, driving assistance based on the VSC operation result is not performed. Moreover, it is assumed that the center 10 has provided the user vehicle 30 with a result of a determination on whether or not the number of ABS operations by the user vehicle 30 is placed high in the rankings which had been made based on the ABS operation results, collected from the user vehicle 30 and the like.

When it is determined that the number of ABS operations is placed high in the rankings (YES in step S24 in FIG. 12), the user vehicle 30 determines whether or not there is a similarity between driving of a vehicle that had previously operated a VSC and driving of the user vehicle 30 (step S25 in FIG. 12). Similarity is determined based on a comparison between driving characteristics information included in the VSC operation result and driving characteristics information of the user vehicle 30. When it is determined that the driving characteristics information has similarity (YES in step S25 in FIG. 12), the user vehicle 30 performs driving assistance based on the VSC operation result (step S23 in FIG. 12) and terminates the process of driving assistance based on the VSC operation result.

On the other hand, when it is determined that the driving characteristics information does not have similarity (NO in step S25 in FIG. 12), the user vehicle 30 terminates the process of driving assistance based on the assistance information. In other words, driving assistance based on the VSC operation result is not performed.

If it is determined that a VSC is operative in the user vehicle 30 (YES in step S21 in FIG. 12), the user vehicle 30 determines whether or not the VSC operation result of a vehicle that had previously operated a VSC is similar to the VSC operation result of the user vehicle 30 (step S22 in FIG. 12). When it is determined that the VSC operation result of a vehicle that had previously operated a VSC is not similar to the VSC operation result of the user vehicle 30 (NO in step S22 in FIG. 12), the user vehicle 30 terminates the process of driving assistance based on the assistance information. In other words, driving assistance based on the VSC operation result is not performed.

On the other hand, when it is determined that the VSC operation result of a vehicle that had previously operated a VSC is related to the VSC operation result of the user vehicle 30 (YES in step S22 in FIG. 12), the user vehicle 30 performs driving assistance based on the VSC operation result (step S23 in FIG. 12) and terminates the process of driving assistance based on the VSC operation result.

As a result, the user vehicle 30 is able to perform driving assistance based on a VSC operation result to which driving characteristics information similar to the driving characteristics information of the user vehicle 30 is associated. Accordingly, even when the user vehicle 30 is not mounted with a VSC, driving assistance suitable to the driving characteristics of the driver can be performed based on a VSC operation result. In other words, driving assistance that is less likely to cause discomfort or inconvenience in the driver can be provided.

As described above, with the driving assistance system and the driving assistance method according to the embodiment, the operational effects described below can be achieved in addition to those described earlier in the first embodiment.

Since the determination of whether or not an ABS operation result is related to a VSC operation result is performed in consideration of a similarity between driving characteristics information of the user vehicle 30 and driving characteristics information of a VSC operation result, driving assistance suitable to a user can be performed. Accordingly, driving assistance can be provided more effectively.

Other Embodiments

The respective embodiments described above can also be implemented in the following aspects. The respective embodiments described above exemplify cases where a position of a vehicle (movable body) is acquired by the position sensor 25. However, this configuration is not restrictive and the position may be acquired by, for example, a GPS mounted on a mobile information processing, apparatus. Accordingly, the flexibility of design of the driving assistance system is enhanced.

The respective embodiments described above exemplify cases where the vehicle information acquisition unit 27 is provided with the wheel speed sensor 271, the acceleration sensor 272, the yaw rate sensor 273, the engine sensor 274, the accelerator sensor. 275, and the brake sensor 276. However, this configuration is not restrictive and the vehicle information acquisition unit may include at least one of a wheel speed sensor, an acceleration sensor, a yaw rate sensor, an engine sensor, an accelerator sensor, and a brake sensor. Accordingly, the flexibility of design of the driving assistance system is enhanced.

The respective embodiments described above exemplify cases where the navigation apparatus 24, the position sensor 25, the clock 26, and the vehicle exterior information acquisition unit 28 are provided in each vehicle. However, this configuration is not restrictive and a vehicle need only be provided with at least one of a navigation apparatus, a position sensor, a clock, and a vehicle exterior information acquisition unit as long as the driving assistance system is functional. Accordingly, the flexibility of design of the driving assistance system is enhanced.

The respective embodiments described above exemplify cases where driving assistance to a driver is performed via the HMI 241. However, this configuration is not restrictive and driving assistance may be performed by intervention control to the ABS unit or the VSC unit, to another drive system, or to an engine system. Examples of such intervention control include fuel cutting and assistive braking. Accordingly, the flexibility of design of the driving assistance apparatus is enhanced.

The respective embodiments described above exemplify cases where the center 10 is provided with the operation information management unit 12, the operation information providing unit 13, and the storage unit 14. However, this configuration is not restrictive and the center may instead be only provided with at least one of an operation information management unit, an operation information providing unit, and a storage unit. In this case, components not provided in the center may be provided in, for example, a provider vehicle or a user vehicle. Accordingly, the flexibility of configuration of the driving assistance system is enhanced.

For example, when the operation information providing unit is provided in the user vehicle 30, the user vehicle 30 selects a VSC operation result related to an ABS operation result of the user vehicle 30 as assistance information and driving assistance is performed to the user vehicle 30 based on the selected assistance information (the VSC operation result). Accordingly, driving assistance can be preferably provided.

The respective embodiments described above exemplify cases provided with the center 10. However, this configuration is not restrictive and a center may not be provided. For example, components of the center may be mounted to a user vehicle or a provider vehicle. Accordingly, the freedom of configuration of the driving assistance system is enhanced.

The first embodiment described above exemplifies a case where a relevance between an ABS operation result and a VSC operation result is determined for each vehicle. However, this configuration is not restrictive and the relevance may be determined for each user. For example, by managing the number of ABS operations for each user, whether or not an ABS operation result is related to a VSC operation result can be determined for each user.

Accordingly, driving assistance suitable to the user can be performed. As a result, driving assistance can be provided more effectively.

The second and the third embodiment described above exemplify a case where driving characteristics information is generated and managed for each vehicle. However, this configuration is not restrictive and driving characteristics information may be generated and managed for each user.

Accordingly, since whether or not an ABS operation result is related to a VSC operation result is determined for each user, driving assistance suitable for the user can be performed. As a result, driving assistance can be provided more effectively.

The respective embodiments described above exemplify cases where the plurality of provider vehicles 20A to 20D are passenger cars, buses, trucks, or the like. However, this configuration is not restrictive and the provider vehicles may be vehicles of other types. Accordingly, the flexibility of configuration of the driving assistance system is enhanced.

The respective embodiments, described above exemplify cases where the user vehicle 30 is a vehicle such as a passenger car. However, this configuration is not restrictive and the user vehicle may be a vehicle included in the provider vehicles described above. Accordingly, the flexibility of configuration of the driving assistance system is enhanced.

The respective embodiments described above exemplify cases where whether or not a VSC operation result is related to an ABS operation result is determined based on whether or not the number of ABS operations is placed high in the rankings. However, this configuration is not restrictive and whether or not an ABS operation result is related to a VSC operation result may be determined based on whether or not the number of VSC operations is placed high in the rankings. Based on data showing that a vehicle (driver) on which a VSC has been operated a large number of times has also operated an ABS a large number of times, even with a vehicle in which a VSC is operative but an ABS is not mounted or an ABS is inoperative, an ABS operation result can be effectively used for driving assistance by selecting ABS operation results based on relevance to VSC operation results. Accordingly, the freedom of design of the driving assistance system is enhanced and an application range is expanded.

The respective embodiments described above exemplify cases where the provider vehicle 20A and the user vehicle 30 differ from each other. However, this configuration is not restrictive and functions of a provider vehicle and functions of a user vehicle may be provided in a single vehicle. Accordingly, an application range of such a driving assistance system can be expanded.

The respective embodiments described above exemplify cases where the operation information management units 22 and 32 are mounted on vehicles (20A, 30, and the like). However, this configuration is not restrictive and, in the driving assistance system, a part of the operation information management unit, a part of or all of the vehicle exterior information acquisition unit, the storage unit, the position sensor, and the like may be provided outside of the vehicle. For example, an external apparatus such as a mobile information processing apparatus may be provided with a function for alternating a part of the operation information management unit, a function of all of or a part of the vehicle exterior information acquisition unit, a storage unit, and a position sensor. In addition, the mobile information processing apparatus may perform driving assistance or a vehicle having acquired necessary information from the mobile information processing apparatus may perform driving assistance.

Accordingly, the flexibility of configuration of the driving assistance system is enhanced. The respective embodiments described above exemplify cases where there is one user vehicle 30. However, this configuration is not restrictive and there may be a plurality of user vehicles. Accordingly, the application range of the driving assistance system is expanded.

The respective embodiments described above exemplify cases where the driving assistance system performs driving assistance on a vehicle. However, this configuration is not restrictive and the driving assistance system may be applied to a system that performs driving assistance on a movable body other than a vehicle such as a railroad vehicle, an ocean vessel, or a robot. Accordingly, the application range of the driving assistance system is expanded.

The invention claimed is:

1. A driving assistance system comprising:
a storage apparatus configured to store operation results of first assistance apparatuses acquired from a plurality of first movable bodies;
a determination unit configured to determine whether or not an operation result of a second assistance apparatus acquired from a second movable body is related to the operation results of the first assistance apparatuses stored in the storage apparatus;
an information providing unit configured to provide assistance information based on the operation results of the first assistance apparatuses when the determination unit determines that the operation result of the second assistance apparatus acquired from the second movable body is related to the operation results of the first assistance apparatuses stored in the storage apparatus; and
an assistance unit configured to acquire assistance information provided by the information providing unit and to perform driving assistance on the second movable body based on the assistance information, wherein:
each first movable body is a vehicle that includes the first assistance apparatus and the second assistance apparatus;
the second movable body is a vehicle that includes the second assistance apparatus, and not the first assistance apparatus; wherein the first assistance apparatus is an apparatus configured to prevent a vehicle from skidding to stabilize the vehicle, and the second assistance apparatus is an apparatus configured to prevent wheels from locking during braking; and
the determination unit is configured to determine whether or not the operation result of the second assistance apparatus acquired from the second movable body is related to the operation results of the first assistance apparatuses stored in the storage apparatus based on the number of previous operations of the second assistance apparatus of the second movable body.

2. The driving assistance system according to claim 1, wherein the determination unit is configured to determine for each user whether or not the operation result of the second assistance apparatus acquired from the second movable body is related to the operation results of the first assistance apparatuses stored in the storage apparatus based on the operation result of the second assistance apparatus for each user.

3. The driving assistance system according to claim 1, wherein the storage apparatus and the determination unit are provided outside of the first movable bodies and the second movable body.

4. The driving assistance system according to claim 1, wherein:
the information providing unit is provided outside of the first movable bodies and the second movable body; and
the information providing unit is configured to provide the assistance unit with only assistance information for which the determination unit has determined that the operation result of the second assistance apparatus acquired from the second movable body is related to the operation results of the first assistance apparatuses stored in the storage apparatus.

5. The driving assistance system according to claim 1, wherein:
the information providing unit is provided on the second movable body; and
the information providing unit is configured to provide the assistance unit with the assistance information obtained based on a determination result of the determination unit.

6. The driving assistance system according to claim 1, wherein:
the assistance information includes an operation position at which one of the first assistance apparatuses had been operated; and
the information providing unit is configured to provide the assistance information when the second movable body reaches the operation position.

7. The driving assistance system according to claim 1, further comprising a driving characteristics determination unit configured to determine whether or not first driving characteristics information associated with operation results of the first assistance apparatuses stored in the storage apparatus are similar to second driving characteristics information associated with an operation result of the second assistance apparatus acquired from the second movable body, wherein:

the first driving characteristics information and the second driving characteristics information are information that respectively indicate characteristics of driving operations performed by drivers; and the information providing unit is configured to provide the assistance unit with the assistance information when the determination unit determines that the operation result of the second assistance apparatus acquired from the second movable body is related to the operation results of the first assistance apparatuses stored in the storage apparatus and when the driving characteristics determination unit determines that the first driving characteristics information is similar to the second driving characteristics information.

8. A driving assistance method used by a driving assistance system including a storage apparatus configured to store operation results of first assistance apparatuses acquired from a plurality of first movable bodies, the method comprising:

determining whether or not an operation result of a second assistance apparatus acquired from a second movable body is related to the operation results of the first assistance apparatuses stored in the storage apparatus;

providing assistance information based on the operation results of the first assistance apparatuses when determination is made that the operation result of the second assistance apparatus acquired from the second movable body is related to the operation results of the first assistance apparatuses stored in the storage apparatus; and performing driving assistance on the second movable body based on the provided assistance information, wherein:

each first movable body is a vehicle that includes the first assistance apparatus and the second assistance apparatus;

the second movable body is a vehicle that includes the second assistance apparatus, and not the first assistance apparatus;

the first assistance apparatus is an apparatus configured to prevent a vehicle from skidding to stabilize the vehicle, and the second assistance apparatus is an apparatus configured to prevent wheels from locking during braking; and it is determined whether or not the operation result of the second assistance apparatus acquired from the second movable body is related to the operation results of the first assistance apparatuses stored in the storage apparatus based on the number of previous operations of the second assistance apparatus of the second movable body.

* * * * *

UNITED STATES PATENT AND TRADEMARK OFFICE
CERTIFICATE OF CORRECTION

| | |
|---|---|
| PATENT NO. | : 9,533,662 B2 |
| APPLICATION NO. | : 14/438444 |
| DATED | : January 3, 2017 |
| INVENTOR(S) | : Satoshi Uno |

It is certified that error appears in the above-identified patent and that said Letters Patent is hereby corrected as shown below:

Assignee (73):
TOYOTA JODPSHA BAUSHIKI KAISHA has been replaced with --TOYOTA JIDOSHA KABUSHIKI KAISHA--.

Signed and Sealed this
Third Day of October, 2017

Joseph Matal
*Performing the Functions and Duties of the*
*Under Secretary of Commerce for Intellectual Property and*
*Director of the United States Patent and Trademark Office*